United States Patent
van Brandenburg et al.

(10) Patent No.: US 10,652,343 B2
(45) Date of Patent: May 12, 2020

(54) LOCATING AND RETRIEVING SEGMENTED CONTENT

(75) Inventors: Ray van Brandenburg, The Hague (NL); Mattijs Oskar van Deventer, Leidschendam (NL); Omar Aziz Niamut, Vlaardingen (NL)

(73) Assignee: Koninklijke KPN N.V., Rotterdam (NL)

( * ) Notice: Subject to any disclaimer, the term of this patent is extended or adjusted under 35 U.S.C. 154(b) by 1235 days.

(21) Appl. No.: 14/122,172

(22) PCT Filed: Jun. 7, 2012

(86) PCT No.: PCT/EP2012/060791
§ 371 (c)(1),
(2), (4) Date: Nov. 25, 2013

(87) PCT Pub. No.: WO2012/168356
PCT Pub. Date: Dec. 13, 2012

(65) Prior Publication Data
US 2014/0089465 A1   Mar. 27, 2014

(30) Foreign Application Priority Data
Jun. 8, 2011 (EP) .................... 11169199

(51) Int. Cl.
*H04L 29/08* (2006.01)
*H04L 29/06* (2006.01)
(52) U.S. Cl.
CPC ............ *H04L 67/18* (2013.01); *H04L 65/605* (2013.01); *H04L 67/2842* (2013.01); *H04L 65/4084* (2013.01)
(58) Field of Classification Search
CPC ... H04L 67/18; H04L 67/2842; H04L 65/605; H04L 65/4084
See application file for complete search history.

(56) References Cited

U.S. PATENT DOCUMENTS 6,792,265 B1 *  9/2004  Chan ................ H04M 3/42348
                                                       455/416
2002/0078174 A1   6/2002  Sim et al.
(Continued)

FOREIGN PATENT DOCUMENTS

AU   2010202034 B1   12/2010
EP   1 125 219 B1    3/2004
(Continued)

OTHER PUBLICATIONS

De Foy et al.; "Content Delivery Network Interconnection (CDNI) Mechanism"; Filed Jun. 1, 2011 (Year: 2011).*
(Continued)

*Primary Examiner* — Backhean Tiv
*Assistant Examiner* — Jihad K Boustany
(74) *Attorney, Agent, or Firm* — McDonnell Boehnen Hulbert & Berghoff LLP

(57) ABSTRACT

Methods and systems are described for retrieving segmented content originating from two or more content delivery networks. The method may comprise the steps of: retrieving a manifest file template associated with said segmented content comprising one or more pointers to database entries of said first content location database; using said one or more database entries for determining a location of a delivery node in said first or second content delivery network, said delivery node being configured for delivering a segment associated with said database entry; and, generating a manifest file for locating said segmented content by replacing pointers with said determined locations.

14 Claims, 18 Drawing Sheets

(56) References Cited

U.S. PATENT DOCUMENTS

| | | | |
|---|---|---|---|
| 2003/0204602 A1* | 10/2003 | Hudson | D01D 5/423 709/228 |
| 2005/0021533 A1* | 1/2005 | Ayachitula | G06F 16/25 |
| 2007/0094300 A1* | 4/2007 | Abnous | G06F 16/256 |
| 2008/0059631 A1* | 3/2008 | Bergstrom | H04N 7/17318 709/224 |
| 2008/0072264 A1 | 3/2008 | Crayford | |
| 2008/0222281 A1 | 9/2008 | Dilley et al. | |
| 2009/0049185 A1* | 2/2009 | Hudson | G06F 15/16 709/231 |
| 2009/0150518 A1* | 6/2009 | Lewin | G06F 16/9574 709/219 |
| 2009/0157850 A1* | 6/2009 | Gagliardi | G06F 17/30864 709/219 |
| 2009/0172801 A1* | 7/2009 | Friedrich | H04L 29/12066 726/12 |
| 2010/0161387 A1* | 6/2010 | Harrang | H04L 1/0002 709/238 |
| 2010/0293058 A1* | 11/2010 | Maher | G06Q 30/00 705/14.66 |
| 2011/0082924 A1 | 4/2011 | Gopalakrishnan | |
| 2011/0096828 A1* | 4/2011 | Chen | H04N 21/23106 375/240.02 |
| 2014/0245359 A1* | 8/2014 | De Foy | H04W 36/0011 725/62 |

FOREIGN PATENT DOCUMENTS

| | | |
|---|---|---|
| EP | 1 675 027 A1 | 6/2006 |
| WO | 2011/022405 A2 | 2/2011 |
| WO | 2011/038032 A2 | 3/2011 |
| WO | 2011/041709 A1 | 4/2011 |

OTHER PUBLICATIONS

European Search Report, European Patent Application No. 11169199.4, dated Jan. 26, 2012.

Partial European Search Report, European Patent Application No. 11169199.4, dated Oct. 26, 2011.

PCT International Search Report and Written Opinion, PCT International Application No. PCT/EP2012/060791, dated Nov. 29, 2012.

Peterson, L et al., "A Simple Approach to CDN Interconnection draft-peterson-cdni-strawman-00", Internet Engineering Task Force, Internet Draft, Apr. 19, 2011, pp. 1-27.

"Telecommunications and Internet Converged Services and Protocols for Advanced Networking (TISPAN); Content Delivery Network (CDN) Architecture", ETSI TS 182 019, V3.1.1, Jun. 2011, pp. 1-82.

Pathan, Mukaddim et al., "Maximizing Utility for Content Delivery Clouds", WISE '09 Proceedings of the 10th International Conference on Web Information Systems Engineering, 2009, 14 pages.

Cloud Files, Developer Guide, Rackspace Hosting, docs.rackspacecloud.com/api, API v1 Mar. 25, 2011, 51 pages.

Niven-Jenkins, B. et al., "Content Distribution Network Interconnection (CDNI) Problem Statement (draft-jenkins-cdni-problem-statement-01)", Network Working Group, Internet-Draft, Jan. 17, 2011, pp. 1-33.

"HTTP Dynamic Streaming on the Adobe Flash Platform. Enabling High-Quality, Network-Efficient HTTP Streaming for Media Delivery", Adobe Flash Platform Technical White Paper, printed from World Wide Web on Feb. 9, 2016 (https://bugbase.adobe.com/index.cfm?event=file.view&id=29430648,seqNum=6&name=httpdynamicstreaming_wp_ue.pdf).

Ma, K. et al., "Content Distribution Network Interconnection (CDNI) Publisher Use Cases (draft-ma-cdni-publisher-use-cases-00)", Network Working Group, Internet—Draft, Mar. 7, 2011, pp. 1-14.

Bertrand, G. et al., "Content Distribution Network Interconnection (CDNI) Experiments (draft-bertrand-cdni-experiments-00)", Internet Engineering Task Force, Internet—Draft, Feb. 16, 2011, pp. 1-20.

Bertrand, G. et al., "Use Cases for Content Distribution Network Interconnection (draft-bertrand-cdni-use-cases-01)", Internet Engineering Task Force, Internet—Draft, Jan. 28, 2011, pp. 1-21.

Niven-Jenkins, B. et al., "Content Distribution Network Interconnection (CDNI) Problem Statement (draft-jenkins-cdni-problem-statement-02)", Network Working Group, Internet-Draft, Mar. 13, 2011, pp. 1-37.

Faucheur, F. Le et al., "Content Distribution Network Interconnection (CDNI) Requirements (draft-lefaucheur-cdni-requirements-01)", Network Working Group, Internet—Draft, Mar. 14, 2011, pp. 1-22.

"Mobile Streaming Media CDN Enabled by Dynamic SMIL", MCSE Lab., dated Aug. 16, 2006, 20 pages.

Pathan, Mukaddim et al., "Load and Proximity Aware Request-Redirection for Dynamic Load Distribution in Peering CDNs", OTM '08 Proceedings of the OTM 2008 Confederated International Conferences, CoopIS, DOA, GADA, IS, and ODBASE 2008, Part I on on the Move to Meaningful Internet Systems, 2008, 18 pages.

"Three Screen IP Video Delivery. Understanding IP Video Transcoding, Packaging and Delivery Requirements for Carrier-Class Providers", White Paper, © 2010, RGB Networks, Inc., 16 pages.

Dixon, Colin, "The Cloud Effect, Can Cloud Resources Be Used to Deliver Quality, Scalable and Affordable OTT video?", The Diffusion Group, Insights in Front of the Curve, pp. 1-13, printed from World Wide Web on Feb. 9, 2016 (http://www.octoshape.com/wp-content/uploads/2012/08/TheCloudEffect_TDG2011.pdf).

Laukens, Niels, "Adaptive Streaming, a Brief Tutorial", EBU Technical Review, 2011 Q1, pp. 1-6.

Pathan, Mukaddim et al., "A Utility Model for Peering of Multi-Provider Content Delivery Services", 2009 IEEE 34th Conference on Local Computer Networks, Zurich, Switzerland, Oct. 20-23, 2009, 8 pages.

Stockhammer, Thomas, "Dynamic Adaptive Streaming Over HTTP—Design Principles and Standards", MMSys '11 Proceedings of the Second Annual ACM Conference on Multimedia Systems, 2011, 3 pages.

Thompson, B. et al., "ATIS Internet Sourced Content Initiative and Relevance to CDNI (draft-thomspon-cdni-atis-scenarios-00)", Network Working Group, Internet—Draft, Mar. 29, 2011, pp. 1-16.

Pathan, Mukaddim et al., "Resource Discovery and Request-Redirection for Dynamic Load Sharing in Multi-Provider Peering Content Delivery Networks", Journal of Network and Computer Applications, vol. 32, Issue 5, Sep. 2009, pp. 976-990.

* cited by examiner

Table: "CLM"

| Name | Type | Location |
|---|---|---|
| "Movie-1" | "Video File" | "Movie-1_Location" |
| "Movie-2" | "Video File" | "Movie-2_Location" |
| "Movie-3" | "RTP Content Stream" | "Movie-3_Location" |
| "Movie-4" | "Static Manifest File" | "Movie-4_Location" |
| "Movie-5" | "Manifest File template" | "Movie-5_Location" |
| "Movie-5_1" | "Segment" | "Movie-5-1_Location" |
| "Movie-5_2" | "Segment" | "Movie-5-2_Location" |
| ... | ... | ... |

Table: "Movie-2_Location"

| No | URI |
|---|---|
| 1 | cache_1.cdn_A.com /res/Movie_2.avi |
| 2 | cache_2.cdn_A.com /res/Movie_2.avi |

Table: "Movie-4_Location"

| No | URI |
|---|---|
| 1 | cache_1.cdn_A.com /res/Movie_4.mf |

Table: "Movie-5_Location"

| No. | URI |
|---|---|
| 1 | cache_1.cdn_A.com /res/Movie_5.mf |

Table: "Movie-5-1_Location"

| No. | URI |
|---|---|
| 1 | cache_1.cdn_A.com /res/Movie_5-1.seg |
| 2 | cache_2.cdn_A.com /res/Movie_5-1.seg |
| 3 | cdncf.cdn_B.com/index.php?res=Movie-5-1.seg |

Table: "Movie-5-2_Location"

| No. | URI |
|---|---|
| 1 | cache_2.cdn_A.com /res/Movie_5-2.seg |

Figure 2

```
602
File name = Movie_4.mf
Type of segmentation = tiled
Number of segments = 4
Relationships between segments = 2x2 matrix
Segment
    Segment name = cache.source.com/res/Movie-4-1.seg
    Place in whole = (0,0)
Segment
    Segment name = cache.source.com/res/Movie-4-2.seg
    Place in whole = (0,1)
Segment
    Segment name = cache.source.com/res/Movie-4-3.seg
    Place in whole = (1,0)
Segment
    Segment name = cache.source.com/res/Movie-4-4.seg
    Place in whole = (1,1)
```

```
604
File name = Movie_4.mf
Type of segmentation = tiled
Number of segments = 2
Relationships between segments = 1x2 matrix
Segment
    Segment name = cache_1.cdn_A.com/res/Movie-4-1.seg
    Place in whole = (0,0)
Segment
    Segment name = cache_1.cdn_A.com/res/Movie-4-2.seg
    Place in whole = (0,1)
Segment
    Segment name = cache_1.cdn_A.com/res/Movie-4-3.seg
    Place in whole = (1,0)
Segment
    Segment name = cache_1.cdn_A.com/res/Movie-4-4.seg
    Place in whole = (1,1)
```

LOCATING AND RETRIEVING SEGMENTED CONTENT

CROSS REFERENCE TO RELATED APPLICATIONS

The present application is a national stage entry of PCT/EP2012/060791, filed Jun. 7, 2012, and claims priority to EP 11169199.4, filed Jun. 8, 2011. The full disclosures of EP 11169199.4 and PCT/EP2012/060791 are incorporated herein by reference.

FIELD OF THE INVENTION

The invention relates to locating and retrieving segmented content distributed over two or more content delivery networks and, in particular, though not exclusively, to methods, a control function module and a client for locating and retrieving segmented content distributed over two or more content delivery networks, and a computer program product using such method.

BACKGROUND OF THE INVENTION

Currently an increasing number of video streaming techniques make use of so-called segmentation. For example, in HTTP adaptive streaming (HAS), Scalable Video Coding (VCS) and spatially segmented content (e.g. tiled video) use segmentation on the basis of time, quality and space respectively. During the segmentation process a so-called manifest file will be generated which describes the relation between the different segments and the location where the segments may be retrieved.

Segmented video content may be used to dynamically adjust the bandwidth requirements, e.g. by switching from a high to a low quality video stream. Moreover, segmented video may also allow division between popular and less popular video segments. For example, typically content associated with the beginning of a video will be watched more often (more popular) than content at the end. Similarly, low-bitrate lower-quality video content (e.g. the lowest resolution HAS segments or the SVC base layer) will be watched more frequently than high quality content (e.g. higher-resolution HAS segments or an SVC enhancement layer). Hence, when segmenting video content, certain segments will be (much) more often requested by consumers than other segments. This property may be advantageously used by a content delivery network (CDN) which is configured to deliver content to a consumer. It may for example store the segments associated with more popular content at multiple nodes in the CDN so that the bandwidth problem may be reduced and efficient delivery is guaranteed. A CDN content location manager may centrally manage the locations within the CDN where the segments may be retrieved.

In some cases the segments associated with one piece of content may be stored at nodes which belong to two or more different CDN domains. In that case, no central location manager is available to locate the segments in the different CDN domains. Therefore, a manifest file associated with a first CDN may only refer to a routing function in the further CDNs as the first CDN has no knowledge about the location of the segments in the second CDN. Hence, every time a segment in another CDN is requested, a routing request to that CDN is required. Such requests may generate request-routing delays so that its takes a longer time in order to receive the requested segment.

Such routing requests may have negative effects on the performance of the CDN. Content comprising a large number of segments may require a large number of routing requests to other CDNs thereby drastically increasing the request routing load per user. Moreover, routing-request delays may also negatively influence the performance of the client, especially when the client allows user-interaction with the content (e.g. zooming and panning request in case of spatially segmented content). The routing request delays may cause delays in displaying certain requested content thereby negatively influencing the user experience.

CDN interconnect schemes other than the above mentioned routing request mechanism are described in http://tools.ietf.org/html/draft-peterson-cdni-strawman-00. In this article a scheme is proposed on the basis of DNS look-ups and HTTP redirects. Such techniques however require multiple redirects per requested segment thereby introducing undesirable delays, which are undesirable when using content services which require short response times for fast content interaction.

Hence, there is a need in the prior art for efficient localization of segments distributed over two or more CDN domains. In particular, there is a need for methods and systems for localization of segments in multiple CDN domains such that segments may be delivered to a client with minimal delay thereby enabling content services for content play-out devices which require user-interaction functionality e.g. panning, zooming, tilting, seamless switching between high- and low resolution version, etc.

SUMMARY OF THE INVENTION

It is an object of the invention to reduce or eliminate at least one of the drawbacks known in the prior art and to provide in a first aspect of the invention a method for locating, preferably segmented or fragmented content, preferably spatially segmented content, wherein said segmented content may be distributed over at least a first content delivery network associated with a first content location database and a second content delivery network associated with a second content location database. Said method may comprise: retrieving a manifest file template associated with said segmented content comprising one or more pointers to database entries of said first content location database; using said one or more database entries for determining a location of a delivery node in said first or second content delivery network, said delivery node being configured for delivering a segment associated with said database entry; and, generating a manifest file for locating said segmented content by replacing pointers with said determined locations.

In an embodiment said segmented content being distributed over the first or the second content delivery network.

In an embodiment said manifest file template may be retrieved by the first content delivery network and/or it may be retrieved by the second content delivery network.

In one embodiment said manifest file template may be retrieved in response to the reception of a location request for locating at least part of said segmented content.

In further embodiments, said location request is a user (or client) request, preferably requesting segmented content. In yet other embodiments, said location request may be a request from a content control function in a network, preferably an IPTV control function, optionally an IMS based function.

In an embodiment the method may comprise: determining for at least one of said database entries whether said first or said second content delivery network is best suited for delivering a segment associated with at least one of said database entries.

In another embodiment the method may comprise: sending a request to said second content location database to determine a location of a delivery node in said second content delivery network, said delivery node being suitable for delivering a segment associated with at least one of said database entries.

In an embodiment, said request sent to said second content location database is a forwarded, optionally modified, location request.

In a further embodiment, said request sent to said second content location database, may comprise a partial manifest file, comprising one or more segment identifiers.

In an embodiment said determined locations are transmitted from the second content delivery network to the first content delivery network.

In a further embodiment said determined locations are transmitted as part of a, preferably updated, partial manifest file.

In yet another embodiment said, preferably best suited, content delivery network may be determined on the basis of said location request, preferably on the basis of location information associated with said request.

In one embodiment said database entries in said first content location database may comprise a pointer to a database location comprising one or more locators for locating a delivery node configured to deliver a segment.

In another embodiment said database entries in said first content location database may comprise a pointer to a database location comprising one or more pointers to the content location database of said second content delivery node.

In another aspect the invention may relate to a method for moving at least part of a segmented content from a first content delivery network comprising a first content location database to a second content delivery network comprising a second content location database, the method comprising: retrieving a manifest file template associated with said segmented content comprising one or more pointers to database entries of said first content location database; determining segment metrics for at least part of the segments identified in said manifest file template; on the basis of said segment metrics, selecting one or more segments to move to said second content delivery network; generating a partial manifest file by replacing the pointers in said manifest file template associated with said selected one or more segments with one or more locations of delivery nodes in said first content delivery network which are configured to deliver said selected segments; sending said partial manifest file to said second content delivery network. Alternatively the selection process for moving one or more segments to the second content delivery network is not based on segment metrics, but has another basis. E.g. random, predetermined. In such embodiments the step of determining the segment metrics may be omitted.

In one embodiment the method may further comprise: requesting said second content delivery network to ingest at least part of the segments identified in said partial manifest file.

In a further aspect the invention may relate to a control function module for locating segmented content, said content being distributed over at least a first content delivery network associated with a first content location database and a second content delivery network associated with a second content location database, said control function module being configured for: retrieving a manifest file template comprising one or more pointers to database entries of said first content location database; using said one or more database entries for determining a location of a delivery node in said first or second content delivery network, said delivery node being configured for delivering a segment associated with said database entry; and, generating a manifest file for locating said segmented content by replacing pointers with said determined locations.

In yet another aspect, the invention may relate to a client configured to communicate with a control function module as described above, said client being configured: to send a location request for locating at least part of said segmented content to said control function module; to receive a manifest file comprising location information associated with delivery nodes in said first and/or second delivery network; and, to send a request for a segment to at least one of said delivery nodes on the basis of said location information. In further embodiments said control function module may be associated with a first content delivery network. Said client being configured to receive said manifest file from the first or from the second content delivery network.

The invention also relates to a computer program product comprising software code portions configured for, when run in the memory of computer, executing at least one of the method steps as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 2 depicts a content location database according to an embodiment of the invention.

FIG. 6 depicts the update of a manifest file after content ingestion according to an embodiment of the invention.

DETAILED DESCRIPTION

Figure 1:
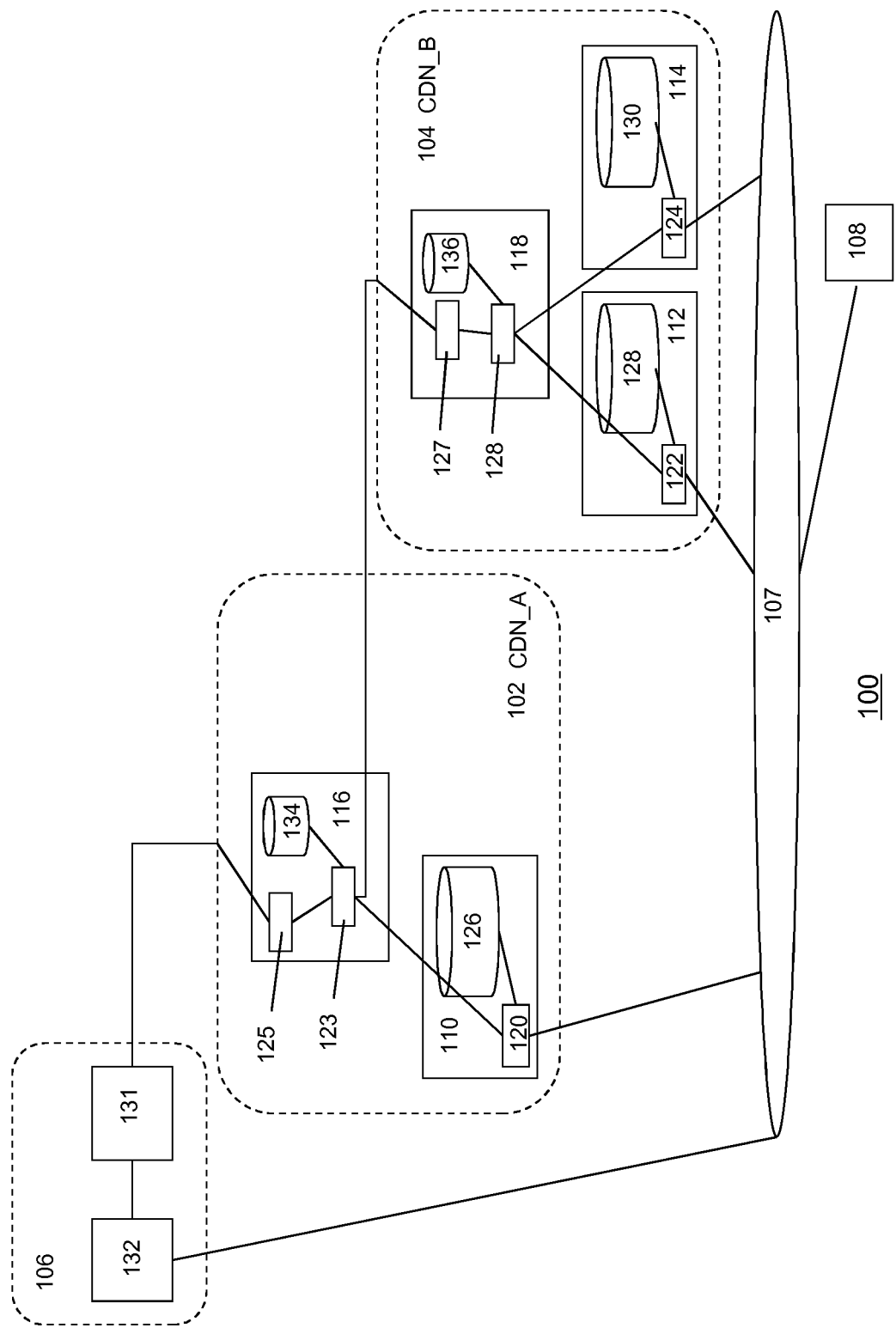
FIG. 1 depicts a content delivery system according to an embodiment of the invention.

FIG. 1 depicts a content delivery system 100 for delivering segmented content to a client according to one embodiment of the invention. The content delivery system may comprise content delivery networks (CDNs), e.g. a first CDN 102 and a second CDN 104, a content source 106 connected via a transport network 107 to one or more terminals hosting a client 108. The content source may relate to a content provider system CPS, a content preparation system or another CDN. A CPS may be configured to offer content, e.g. a video title, to customers, which may purchase and receive the content using a client.

A terminal may generally relate to a content processing device, e.g. a (mobile) content play-out device such as an electronic tablet, a smart-phone, a notebook, a media player, etc. In some embodiment, a terminal may be a set-top box or content storage device configured for processing and temporarily storing content for future consumption by a content play-out device.

Each CDN may comprise delivery nodes 110,112,114 and at least one central CDN node 116,118. Each delivery node may comprise or be associated with a controller 120,122,124 and a cache 126,128,130 for storing and buffering content. Each central CDN node may comprise or may be associated with an ingestion node (or content origin function, COF) 125,127 for controlling ingestion of content from an external source, e.g. a content provider or another CDN, a content location database 134,136 for maintaining information about where content is stored within a CDN and a CDN control function (CDNCF) 123,128 for controlling the distribution of one or more copies of the content to the delivery nodes and for redirecting clients to appropriate delivery nodes (a process also known as request routing). The distribution may be controlled such that throughout the CDN sufficient bandwidth for content delivery to a client is guaranteed. In one embodiment, the CDN may relate to a CDN as described in ETSI TS 182 019.

A customer may purchase content, e.g. video titles, from a CPS 131 by sending a request to a web portal (WP) 132, which is configured to provide title references identifying purchasable content. In response to the request, a client may receive at least part of the title references from the WP and location information, e.g. an URL, of a CDNCF of a CDN, which is able to deliver the selected content.

The CDNCF may send the client location information associated with one or more delivery nodes, which are configured to deliver the selected content to the client. Typically, the CDNCF may select delivery nodes in the CDN, which are best suited for delivering the selected content to the client. Criteria for selecting a delivery node may include location of the client and the processing load of the delivery nodes.

A client may contact the delivery node in the CDN using various known techniques including a HTTP and/or a DNS system. Further, various streaming protocols may be used to deliver the content to the client. Such protocols may include HTTP and RTP type streaming protocols. In a preferred embodiment an adaptive streaming protocol such as HTTP adaptive streaming (HAS), DVB adaptive streaming, DTG adaptive streaming, MPEG DASH, ATIS adaptive streaming, IETF HTTP Live streaming and related protocols may be used.

The CDNs are configured to ingest and distribute segmented content. Content that is not yet segmented or fragmented is sometimes also referred to as Original Content. Known segmented streaming systems may be based on time segmentation, e.g. HTTP adaptive streaming (HAS), quality-based segmentation, e.g. Scalable Video Coding (VCS) and/or spatial segmentation, e.g. tiled video. These systems have in common that content may be organized in a number of segments (pieces or parts), which may be formatted according to a known transport container format such as MPEG or AVI. Segments are sometimes also, in a more general manner, referred to as Chunks. Segments are separately addressable by their own URL and stored as single files from a file-system perspective. In some HTTP based content streaming technologies, the alternative term of Fragment is used. Fragments, which are another type of Chunks, are formed as the result of content fragmentation (instead of content segmentation).

With fragmentation (or virtual segmentation), which is for example used in Microsoft's Smooth Streaming, all chunks, or fragments, belonging to the same Chunk Collection are stored together, as part of a single file. While there are a number of container formats which allow for storing this type chunked content, Fragmented MP4 is most commonly used. With fragmentation, a specific chunk is addressable by subfixing the common file URL with an identifier uniquely identifying the chunk one is interested in, either by timestamp, by byterange, or in some other way. It is to be noted that embodiments of the invention also apply to systems or technologies, wherein fragmentation, rather than segmentation is used. Therefore, for the purpose of this application, the term segment may be used to reflect a Segment, or a Fragment, or in broader terms a Chunk, wherever most appropriate, as these may be encountered in the prior art.

The relation between the segments may be described in a special data structure, which is hereafter referred to as a manifest file, which may be stored and identified using a specific file name extension, e.g. .mf, .xml and .m3u8. The manifest file may further describe the locations and names of the different segments on one or more delivery nodes.

Segments, in particular popular segments, may be retrieved from more than one delivery node in a CDN. Moreover, in certain situations, segments should be retrieved from delivery nodes in another CDN domain. The CDNCF may manage the locations where segments may be retrieved. To that end, the CDNCF may use the content location database 134,136. In one embodiment, the content location database may relate to an Asset Location Function (ALF), as described in ETSI TS 182 019

FIG. 2 depicts a content location database according to an embodiment of the invention. The content location database may comprise a main location table 202 comprising entries associated with file names of a particular type. Each entry further comprises a location pointer which refers to a database record 204-212 comprising one or more file locators, e.g. URLs, for locating delivery nodes within the CDN domain of the CDNCF (e.g. CDN A) or within another CDN domain (e.g. CDN B). For example database entry 214 associated with the file name Movie-2 relates to a file of type "Video file" and comprises a location pointer Movie-2_Location pointing to a database record comprising two URLs locating a first and second cache associated with a first and second delivery node of CDN A.

Similarly, database entry 216 associated with the file name Movie-4 relates to a file of type "Static Manifest File" and comprises a location pointer Movie-4_Location pointing towards a record comprising an URL to a delivery node in CDN A which is configured to deliver the manifest file identified in the database entry. The static manifest file type refers to a manifest file which is not dynamically adapted based on user requests but is delivered to a client in the same form as it is stored on a CDN node. A static manifest file identifies a number of segments wherein the segments are stored at the same location as the manifest file itself.

A further database entry 218 associated with the name Movie-5 is identified as a so-called "Manifest File Template" and comprises a location pointer Movie-5_Location pointing toward a record comprising an URL for locating a cache of a delivery node in CDN A which is configured to delivery such manifest file template.

The manifest file template type refers to a manifest file which identifies a number of segment names, e.g. Movie-5_1. In contrast with a normal (static) manifest file the manifest file template does not comprise an URL to a content delivery node which is configured to delivery a particular segment. Instead, each or at least part of the segment names may be associated with a pointer to a database entry in the content location database, e.g. cdncf.cdn_A.com/res/Movie-5_1.seg. The pointer may be used to find information on the location(s) of a segment.

As will be described hereunder in more detail, a manifest file template may be used by a CDN to generate a so-called dynamic manifest file (DMF). It should be noted that a Manifest File Template will never be delivered to an end user, but are only used as a basis for building dynamic manifest files.

Dynamic manifest files are an alternative to static manifest files and used for locating segmented content wherein the segments may be distributed over multiple delivery nodes located in one or more CDN domains. Such distribution of segments allows storage of more frequently requested (i.e. popular) segments on more delivery nodes than less frequently requested segments so that efficient delivery and storage of such segments is guaranteed.

A dynamic manifest file may be generated on the basis of information associated with a user request. For example, a dynamic manifest file may be generated on the basis of the location of the user requesting the segmented content. Using the location information, e.g. IP address, of the user, the CDNCF may determine which delivery nodes are best suited for delivering the segments to the user.

Further database entries 220 and 222 relating two file names Movie-5_1 and Movie-5_2 of the segment type comprise location pointers to records comprising URLs for locating delivery nodes configured to deliver the segments identified in the database entries. Moreover, as indicated in the record associated with location pointer Movie-5-1_Location, locations may also be defined as a reference to a CDNCF function of a further CDN domain (CDN B). In this case, such location reference will also contain a content identifier to uniquely identify the particular segment in the further domain (in this example "Movie-5.1.seg"). As will described below in more detail such references allow mechanisms for retrieving segments in other CDN domains. It should be noted that a CDNCF in one CDN domain will not have direct access to the content location database of another CDN domain. In order to obtain the location of a particular segment in another CDN domain, a request will usually go through the CDNCF function of the other domain, where the content identifier is used to identify the required segment.

Figure 3:
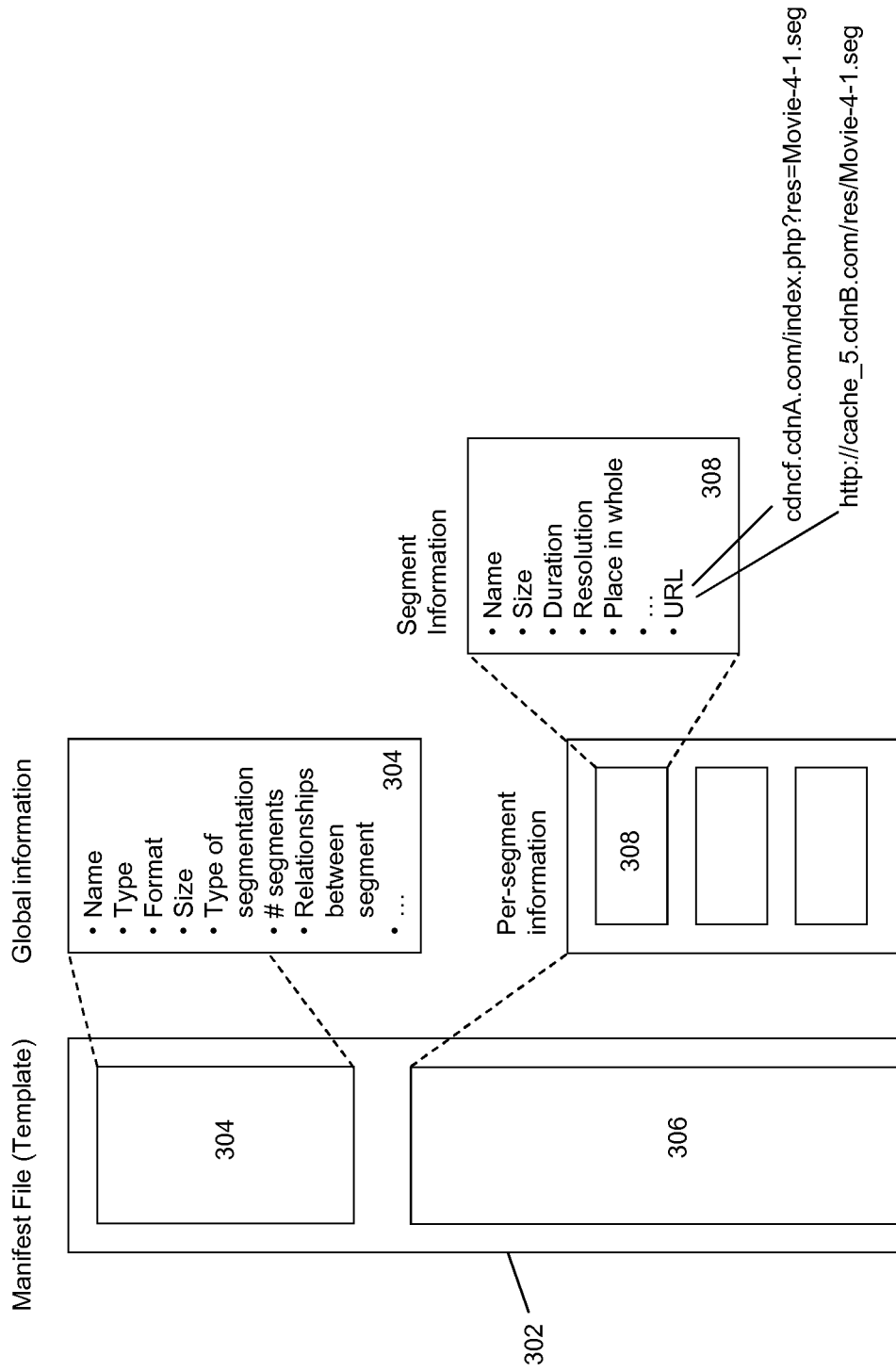
FIG. 3 depicts the general data structure of a manifest file or a manifest file template according to an embodiment of the invention.

FIG. 3 depicts the general data structure of a manifest file (MF) or a manifest file template according to an embodiment of the invention. A MF may comprise a header section 304 and a segment section 306. The header section may comprise global segment information about the segments defined in the segment section. Global information may include the name of the file, the type and format of the segments, the type of segmentation and the relation between the segments (e.g. the temporal or spatial relation between segments). The segment section may comprise local segment information 308 on the individual segments carrying a piece of content. Local segment information may include the name and size of a segment, the play-out duration, the resolution of the content carried in a segment, the position of a segment (e.g. in terms of time or space) and a locator for locating a delivery node in a CDN domain. As already described with reference to FIG. 2, the locator may have the form of a URL (as used for example in a static MF) or a pointer to a database entry of a content location database (as for example used in a MF template).

Figure 4:
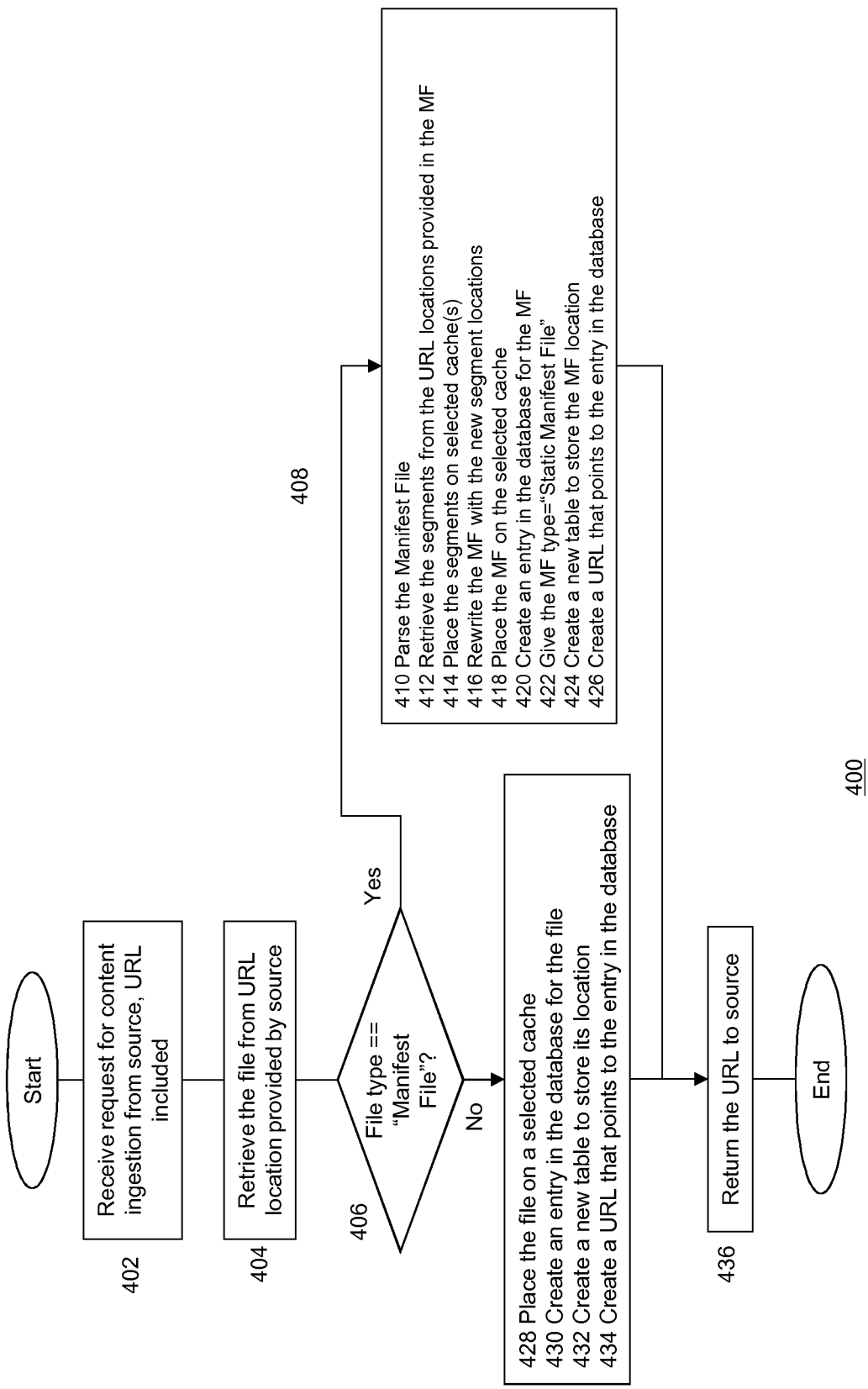
FIG. 4 depicts a flow chart for content ingestion according to an embodiment of the invention.
Figure 5:
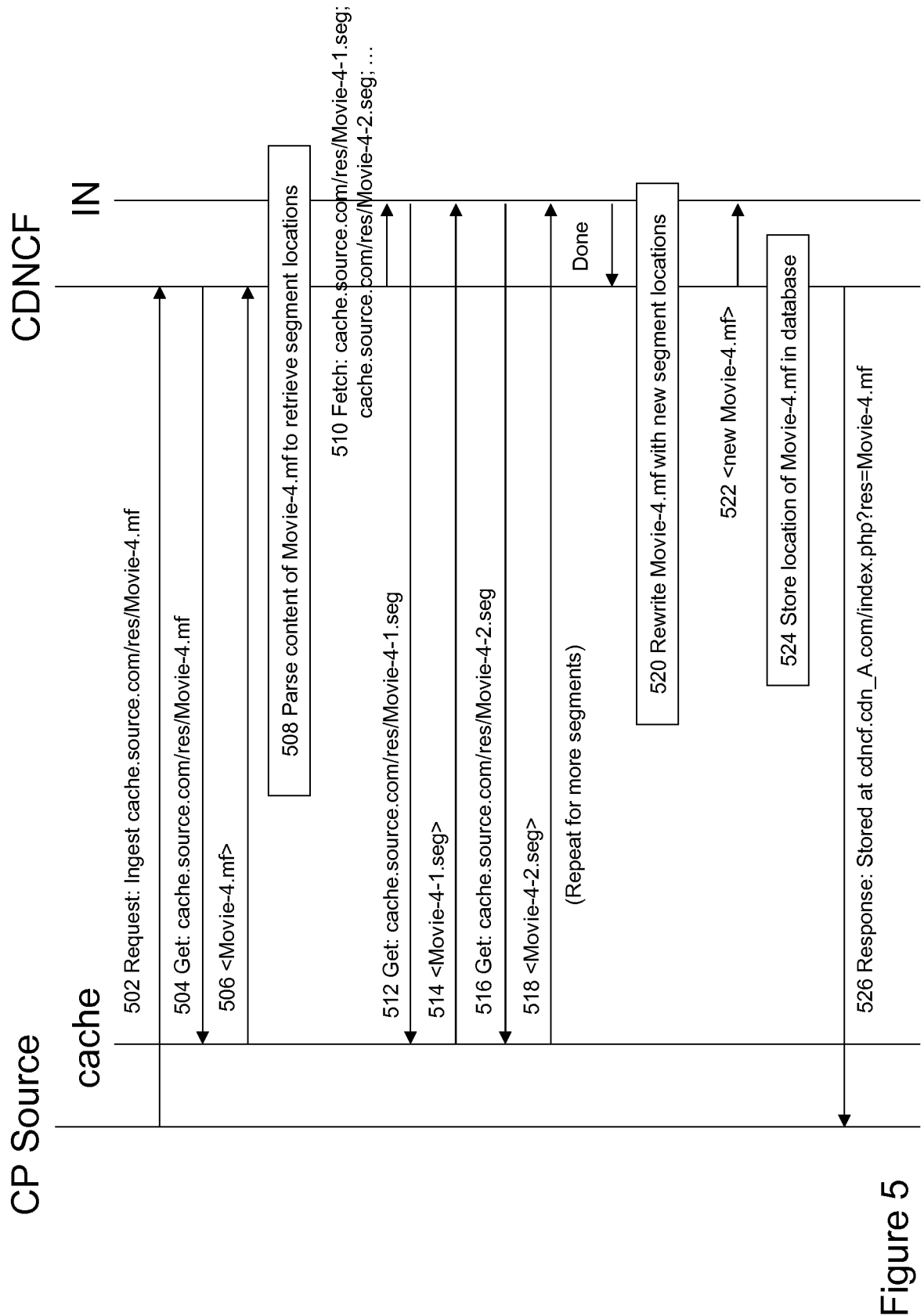
FIG. 5 depicts a sequence diagram for content ingestion according to an embodiment of the invention.

FIGS. 4 and 5 depict a flow chart and a sequence diagram respectively associated with a process of ingesting segmented, preferably spatially segmented, content in accordance with one embodiment of the invention.

The process in FIG. 4 may start with the CDNCF receiving a request for content ingestion originating from a source, e.g. a content provider, a CDN or another content processing entity (step 402). The request may comprise location information, e.g. an URL, and a content identifier. In response, the CDNCF may receive a file (step 404), which may either relate to a manifest file MF or a conventional content file.

If the CDNCF detects an MF (step 406, 408), it may parse the received MF (step 410) in order to retrieve the location information, e.g. URLs, associated with the segments listed in the MF. The CDNCF may then order the ingestion node to execute ingestion of segments on the basis of the received MF (step 412). Optionally, the ingestion node may perform additional processing on the received segments, such as transcoding.

On the basis of processing load, data traffic and/or geographical proximity information associated with the delivery nodes in the CDN (CDN metrics), the CDNCF may then distribute the segments to the caches associated with one ore more distribution nodes (step 414). Thereafter, the CDNCF may update the MF by adding location information associated with the location of the delivery node where the segments were distributed to (step 416). It should be noted that the URLs inserted in the updated MF by the CDNCF may be either absolute URLs, consisting of a full URL path, or relative URLs, only containing path relative to the location of the MF itself. The CDNCF may store the updated (modified) MF with the delivery nodes (step 418) and generate a new entry in the content location database associated with the CDNCF (step 420). Then the CDNCF may assign a "static manifest"-type to the MF (step 422), create a new record in order to store the locations where the updated MF may be retrieved for future use (step 424) and generate an URL that points to the new entry in the content location database (step 426) accessible through the CDNCF. This URL may then be sent to the source (step 436).

If the source ingestion request of the source is associated with conventional content, the content may be distributed to the caches of one or more selected delivery nodes (step 428). A new database entry for the file in the content location database may be created (step 430), including a record for storing URL associate with the stored file (step 432) and an URL that points to the new entry in the database (step 434). This URL may then be sent to the source (step 436).

The sequence diagram of FIG. 5 depicts the process for ingesting segments in more detail. In this example, the CDNCF and the source may use an HTTP-based protocol for controlling the content ingestion. The process may start with the source sending a content ingestion request to the CDNCF wherein the request comprises an URL pointing to a MF named Movie-4.smf (step 502). The CDNCF may retrieve the MF (steps 504 and 506) and parse the MF (step 508) in order to retrieve the spatial segment file locations (e.g. in the form of one or more URLs).

Using the URLs, the CDNCF may instruct the CDN ingestion node to fetch segments identified in the MF (step 510). After having received the segments (steps 512-518), the ingestion node may notify the CDNCF that the content has been successfully retrieved and distributed to a cache of a delivery node in the CDN.

The CDNCF may then update the MF by inserting the location of the delivery node from which the segments may be retrieved into the MF (step 520). The updated MF may be stored with the segments in the cache of the selected delivery node (step 522). The location of the MF may be stored in the content location database associated with the CDNCF (step 524). Further, the CDNCF may send a response back to the source, wherein the response may comprise an URL pointing to an entry in the content location database accessible through the CDNCF of the CDN (step 526).

FIG. 6 depicts an example of part of an MF before and after ingestion of segments as described with reference to FIGS. 4 and 5. The static MF 602 received from the source may have a data structure as described with reference to FIG. 3. The MF may comprise a file name, information regarding the segmentation, e.g. type of segmentation (in this case spatial segmentation), the number of segments and the (spatial) relation between segments. The MF may further indicate that four separate segments Movie-4-1.seg, Movie-4-2.seg, Movie-4-3.seg and Movie-4-4.seg are stored at a certain location cache.source.com/res/ in the source domain.

After ingestion of the segments, the CDNCF may generate an updated static MF 604 comprising updated segment locations in the form of URLs pointing towards a first delivery node cache_1.cdn_A.com/res/ comprising the (spatial) segments Movie-4-1.seg, Movie-4-2.seg, Movie-4-3.seg and Movie-4-4.seg. It should be noted that in the case that a static manifest file and its associated segments is hosted on multiple delivery nodes and absolute URLs are used, that the MF will have different segment URLs on each of the delivery nodes. In the case that relative URLs are being used, the manifest file on the different delivery nodes will be the same.

Hence, from the above it follows that the MF allows controlled ingestion of segments into a CDN. After ingestion, the MF identifies the locations in the CDN where the segments are stored.

As indicated before, a static MF relates to an MF identifying the location of a predetermined number of segments. The MF is static in the sense that the MF is not user-dependent but is predetermined. A static MF will usually point to segment locations that are stored on the same delivery node as the MF itself, although this is not strictly required.

The segments in the static MF however may relate to frequently and less frequently requested segments.

Hence, on the basis of the segment metrics (e.g. general popularity, or number of requests from a specific location or region), segments may be redistributed over multiple distribution nodes in the CDN and optionally other CDNs. Then, when a user requests the delivery of an MF for segmented content, a so-called dynamic MF may be generated on the basis of information associated with the user request. For example, a dynamic MF may be generated comprising locations of content segments in delivery nodes, some of which are close to the location of the user so that efficient local delivery of the requested segments is achieved, whereas others of which may be more remote from the user for less-often-requested content segments.

Figure 7B:
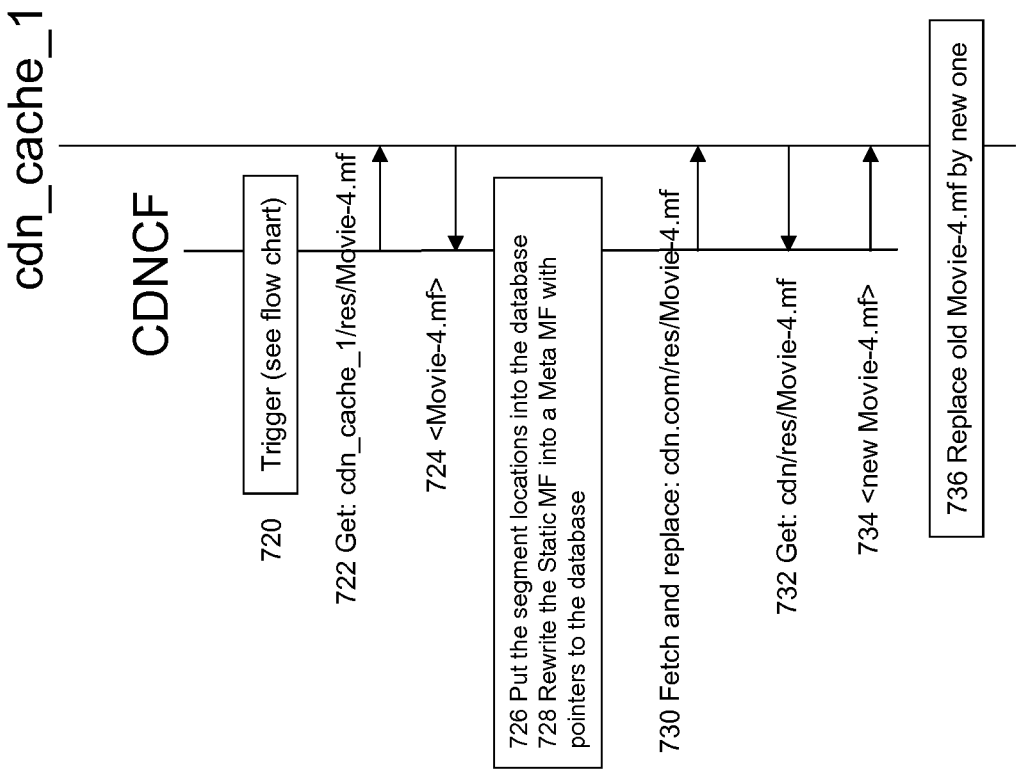
FIG. 7 depicts a flow chart and a sequence diagram of updating a static MF into a MF template according to an embodiment of the invention.
Figure 7A:
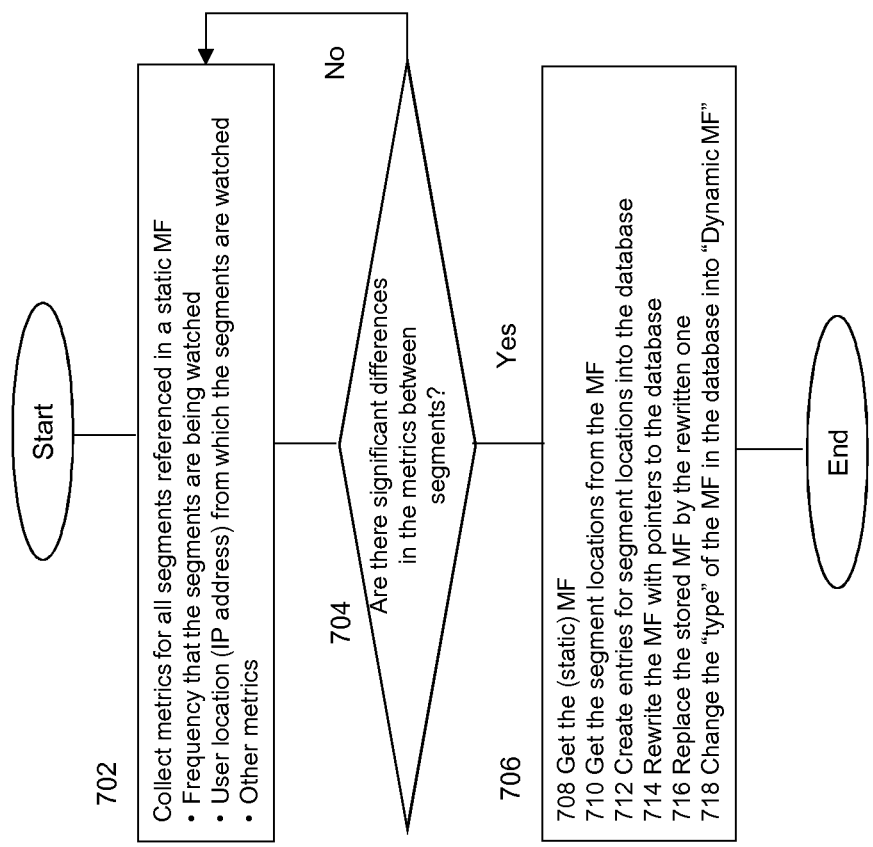

A dynamic MF is generated on the basis of a so-called MF template. FIGS. 7A and 7B depict a flow chart and a sequence diagram of updating a static MF into a MF template according to an embodiment of the invention.

The process in FIG. 7A may start with the collection of segment metrics of segments defined in a static MF. Segment metrics may relate to the frequency that segments are requested and viewed, user locations, e.g. IP address, from which the segments are requested and any other metrics which may determine differences between segments in a static MF (step 702). If significant differences are present the process of creating a MF template may be triggered (step 704). This process may include the steps of: retrieval of the static MF (step 708), retrieval of the segment locations from the static MF (step 710) and the creation of entries in the content location database for segment locations (step 712). Here, based on the segment metrics, the CDNCF may decide to distribute copies of one or more segments, in particular the frequently requested segments, to more than one distribution node in the CDN. Hence, the database entry may comprise two or more URLs for locating the different distribution nodes, which are configured to deliver the particular segment (similar to the database entry of "Movie-5_1" in FIG. 2 having a location pointer to a record comprising amongst others URLs of two delivery nodes which are configured to delivery a predetermined segment Movie_5-1.seg).

Thereafter the static MF may be re-written into an MF template by replacing the locations in the static MF with pointers to the content location database (steps 714 and 716). The MF template creation process may be finished by changing the "type" of the MF into "manifest file template" (step 718).

FIG. 7B depicts the generation of the MF template in more detail. The process may be started by the CDNCF detecting significant differences in the segment metrics of a static MF (step 720). The CDNCF may then retrieve the static MF Movie-4.mf from the cache of the one or more delivery nodes where the MF was stored (steps 722 and 724). Then, the CDNCF may execute the process of entering the segment locations in the database and rewrite the static MF into a MF template comprising pointers to the content location database of the CDN (steps 726 and 728). Thereafter, the (new) MF template is send back to the cache of the one or more delivery nodes where it replaces the (old, static) MF (steps 730-736).

Figure 8:
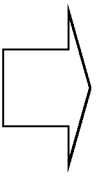
FIG. 8 depicts the process of updating a manifest file template according to an embodiment of the invention.

FIG. 8 depicts the formation of the MF template according to an embodiment of the invention. During the update process described with reference to FIG. 7, the old static MF 802 is updated to a MF template 804 where the segment location URLs are replaced by pointers to entries in the content location database of CDN A, which are accessible through the CDNCF.

Figure 9:
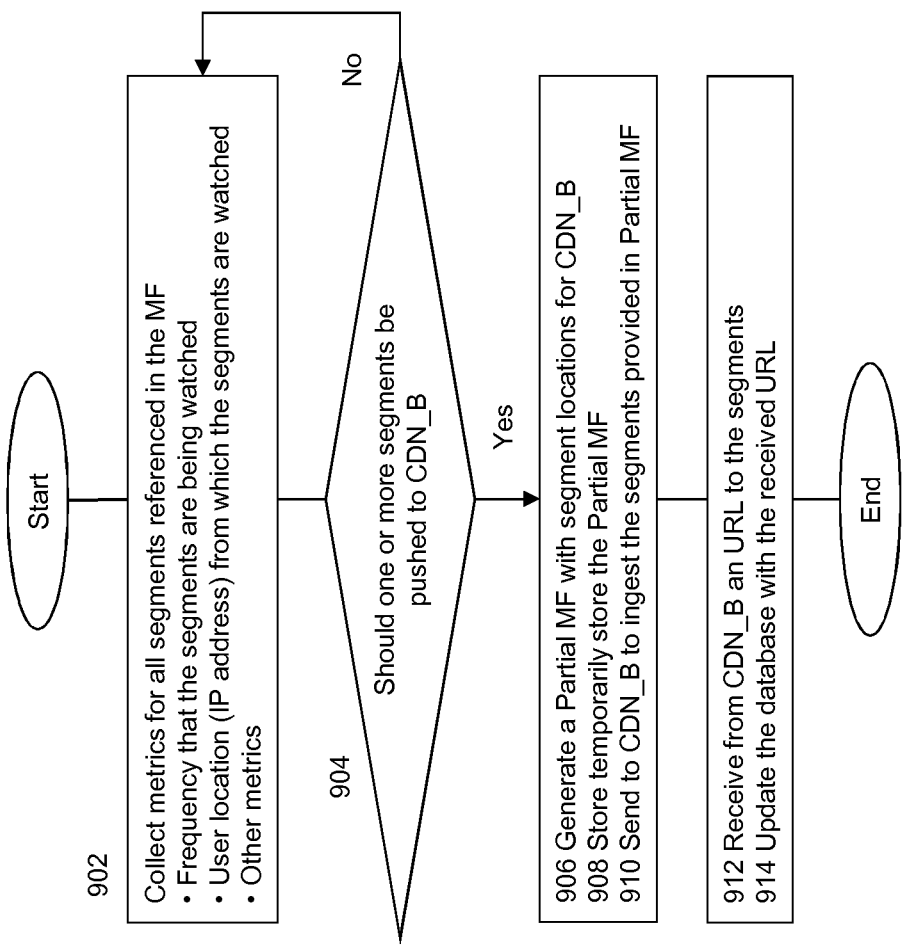
FIG. 9 depicts a flow diagram of moving segments from a first CDN to a second CDN using a partial Manifest File (MF) according to an embodiment of the invention.

After the process of redistributing the storage of segments within the CDN (CDN A) on the basis of segment metrics, the CDNCF may further initiate a process for moving certain segments to another CDN (CDN B). This process is depicted in FIG. 9. In a first step 902 segment metrics may be collected based on the viewing frequency, location (IP address) of the user requesting the segments and other relevant metrics.

From these segment metrics it may become e.g. apparent that certain segments are requested by a large group of users located in a geographical location far away from the graphical location of CDN A. In that case, the CDNCF may decide to push those segments to CDN B close to the geographical location of those users (step 904).

The CDNCF may therefore prepare and temporarily store a so-called partial Manifest File (partial MF) comprising segment locations of delivery nodes in CDN A (steps 906 and 908). The partial MF is "partial" in the sense that a subset of the database entries in the MF template are replaced by URLs while the other database entries are removed. In particular, the database entries in the MF template associated with the segments that need to be ingested by CDN B are replaced with URLs locating the delivery nodes in CDN A configured to deliver those segments. The pointers to the database entries of the segments that are not meant to be ingested by CDN B are removed and marked 'empty'.

The partial MF is subsequently sent to the CDNCF of CDN B, which may use the non-empty segment URLs in the partial MF for the ingestion of those segments (step 910) into its own CDN. After ingestion of the segments in CDN B, the CDNCF of CDNA receives a URL from CDN B that points to the CDNCF of CDN B including a list of content identifiers that uniquely identify the ingested segments in CDN B (step 912). The CDNCF of CDN A updates its content location database with the received URL.

Alternatively, after CDN B has ingested the segments listed in the partial MF, the CDNCF of CDN B does not send a URL to its CDNCF and a list of identifiers indicating the locations of the ingested segments, but a URL pointing to an updated partial MF, updated by CDN B, which now includes the relevant locations within CDN B of the ingested segments. The CDNCF of CDN A may then retrieve the partial MF from CDN B, parse it and populate the CDN A content location database with the URLs for the distributed segments. Alternatively, CDN A may populate its content location database with the URLs, generated as query strings based on the URL received from CDN B and the segment identifiers.

This way, certain entries in the content location database of CDN A may comprise an URL to another CDN (similar to the database entry of "Movie-5_1" in FIG. 2 having a location pointer to the CDNCF of CDN B and an identifier that uniquely identifies the particular segment in CDN B for retrieving the segment Movie_5-1.seg in CDN B).

Figure 10:
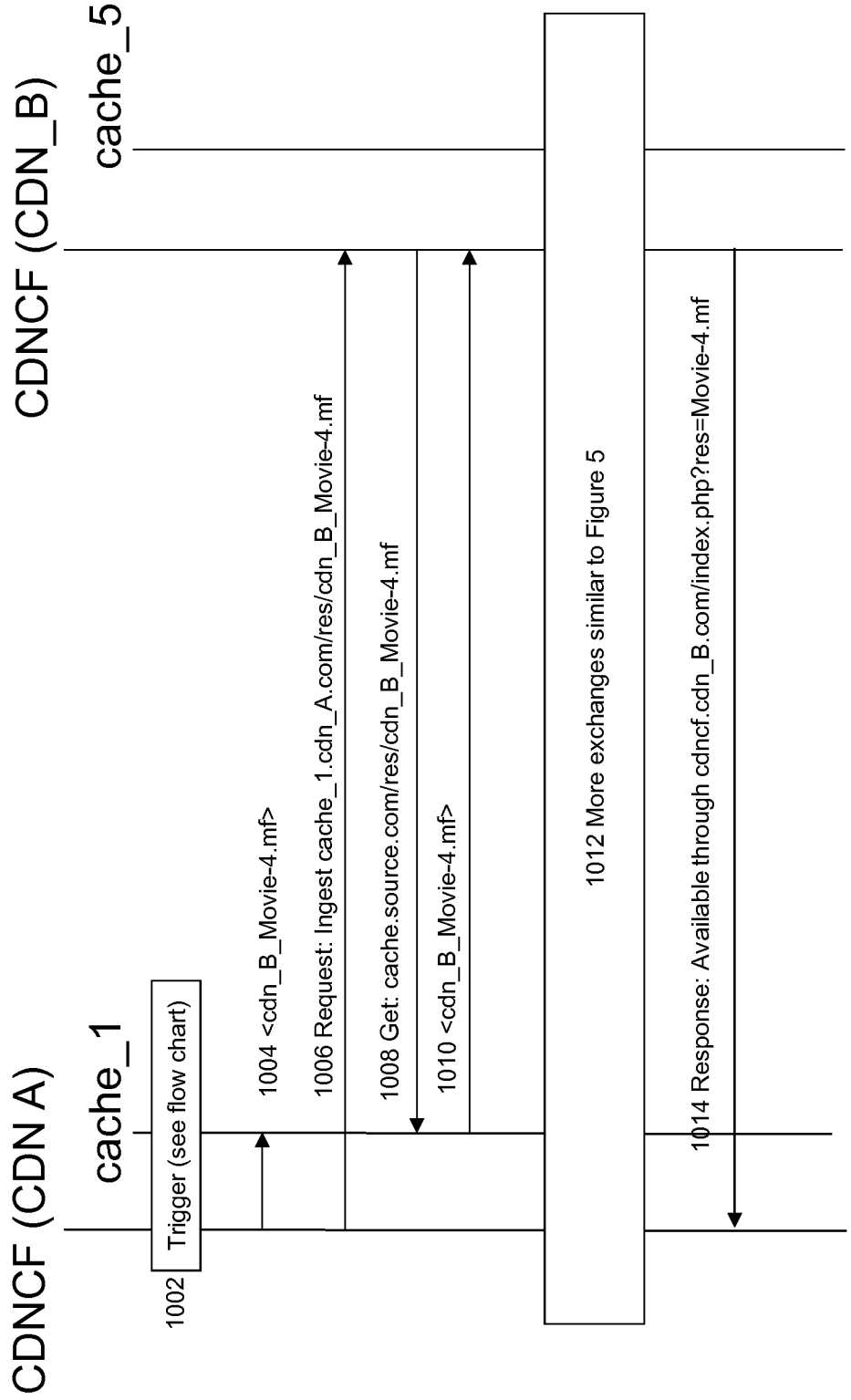
FIG. 10 depicts a sequence diagram of moving segments from a first CDN to a second CDN using a partial MF according to an embodiment of the invention.

FIG. 10 depicts a sequence diagram illustrating the ingestion of segments from a first CDN to a second CDN using a partial MF in more detail. The process may be triggered by CDNCF determining that certain segments should be moved to CDN B (step 1002). To that end, the CDNCF of CDN A may prepare a partial MF cdn_B-Movie-4.mf and store this in a cache (step 1004). Thereafter, the CDNCF of CDN A may send a ingestion request to the CDNCF of CDN B (step 1006), instructing the CDNCF of CDN B to ingest the segments defined in a partial MF which may be located by CDNCF of CDN B on the basis of the URL in the ingest request (steps 1008-1010). Alternatively, CDN A may include the partial MF in the body of the ingestion request being sent to the CDNCF of CDN B. On the basis of the partial MF CDN B subsequently ingests the segments defined in the partial MF. The ingestion process is similar to the process described with reference to FIG. 5 (step 1012). During this process, CDN B may autonomously determine which delivery nodes it may configure for delivering the segments. The only information CDN A receives after the ingestion process is finished is either an URL pointing to the CDNCF of CDN B and a list of identifiers that uniquely identify the segments in CDN B or a URL pointing to an updated partial MF in CDN B that may be used for future retrieval of the manifest file and segment locations (step 1014).

As an alternative to the actual ingestion by CDN B of the segments indicated in the partial manifest file it received from CDN A, the CDN B, preferably the CDNCF of CDN B, may pre-assign these identified segments to locations (caches/nodes) in the CDN B, and update the partial manifest with these locations accordingly. The actual segments may then be ingested by CDN B at a later moment in time. For example when these segments are requested by a client on the basis of a manifest file. Such mechanism also referred to as a "pull" model.

Figure 11:
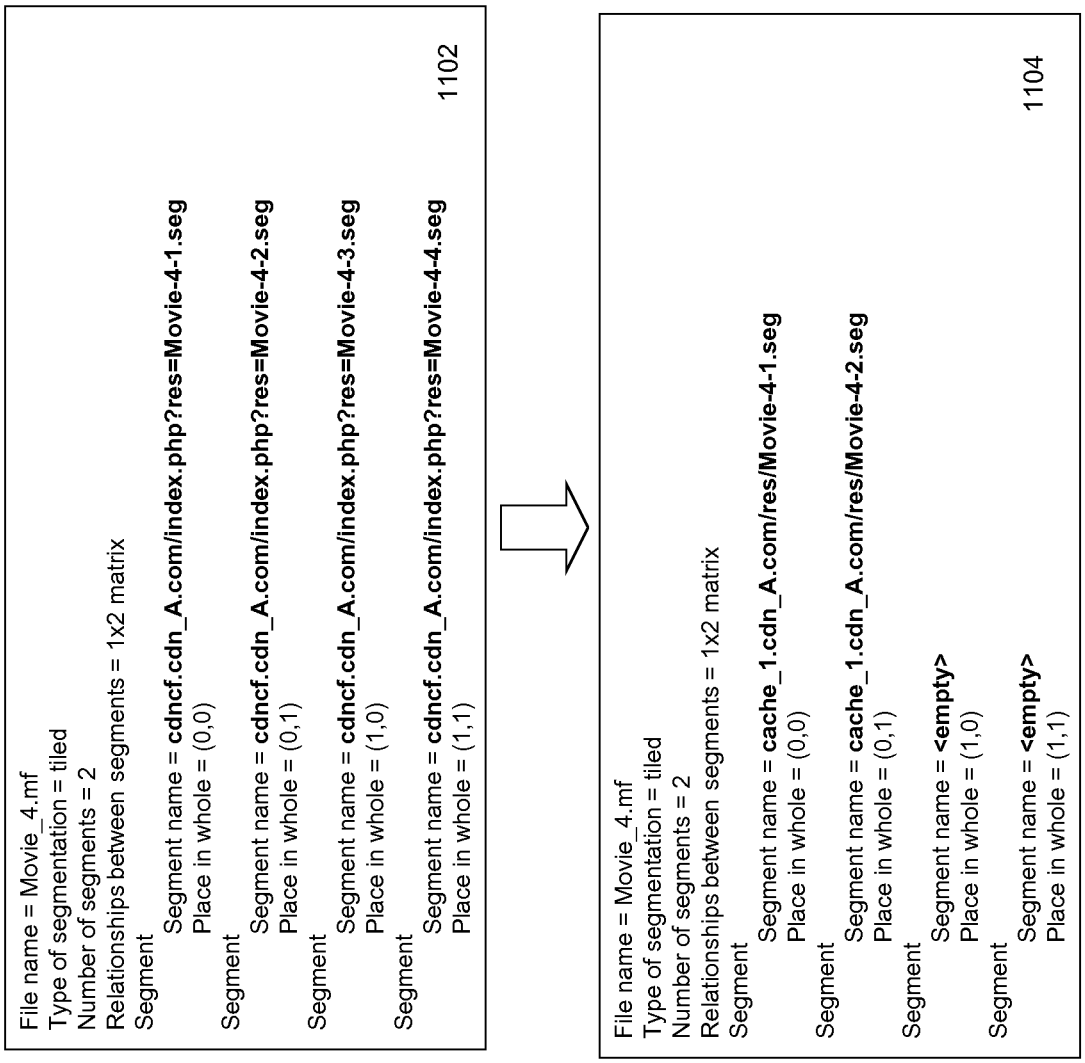
FIG. 11 depicts the formation of a partial MF used for content ingestion according to an embodiment of the invention.

FIG. 11 depicts the formation of a partial MF used for content ingestion in the process described with reference to FIG. 10. The partial MF may be constructed on the basis of the MF template 1102 as described in more detail with reference to FIG. 7. Here, the first two database entries in the MF template associated with segments Movie-4-1.seg and Movie-4-2.seg are replaced by the URLs locating the delivery node which is configure to deliver these segments. The other two database entries are left empty so that those segments are not ingested by CDN B.

Hence, on the basis of the processes described with reference to FIG. 3-10, a CDN may built a content location database comprising entries to MF templates and entries associated with segments which are stored at various delivery nodes which may be located within the CDN domain and/or within the CDN domain of other CDNs. The MF templates may be used to create dynamic MFs (DMFs) in response to a user request wherein the dynamic MF comprises locations for retrieving requested segments, which are optimized on the basis of segment metrics, e.g. metrics associated with the frequency and the geographical location of requests. The locations in the dynamic MF may relate to locations of delivery nodes in different CDN domains. This way a dynamic MF allows a user to efficiently and directly retrieve the segments from the various delivery nodes specified in the dynamic MF without having to endure a redirecting delay for every segment that is stored within another CDN domain. This process is described hereunder in more detail with reference to FIG. 12-18.

Figure 12:
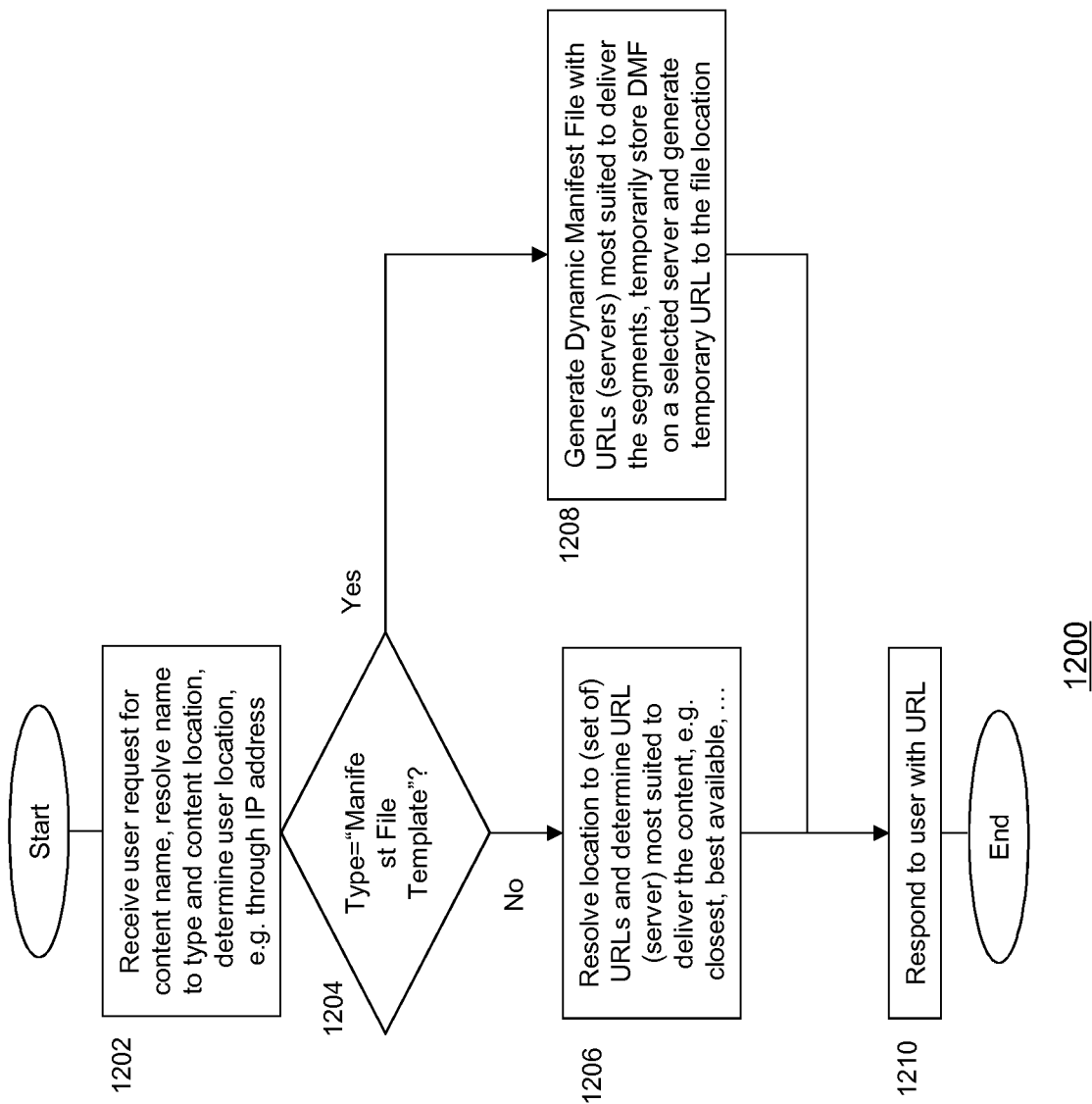
FIG. 12 depicts the flow chart of a process for serving a user request according to an embodiment of the invention.

FIG. 12 depicts the flow chart of a process for serving a user request according to an embodiment of the invention. The process may be started by the CDNCF receiving a user request comprising a content name or identifier (step 1202). The name may be resolved into a file type and location. Further, the user location associated with the user request may be determined on the basis of the IP address.

The CDNCF may then use the content location database to determine whether the resolved file type relates to a MF template or not (step 1204). If this is not the case, the CDNCF may use various metrics, such as the user location and current CDN load, to determine a single delivery node or CDN domain best suited for delivery of the requested content (step 1206). If the resolve file type relates to a MF template, the CDNCF may use the content location database to generate a dynamic MF comprising URLs of one or more delivery nodes, which together are best suited to deliver the requested segments (step 1208). The generated dynamic MF may be temporarily stored with the CDNCF and an URL for locating the DMF is sent in a response to the user (step 1210).

Figure 13:
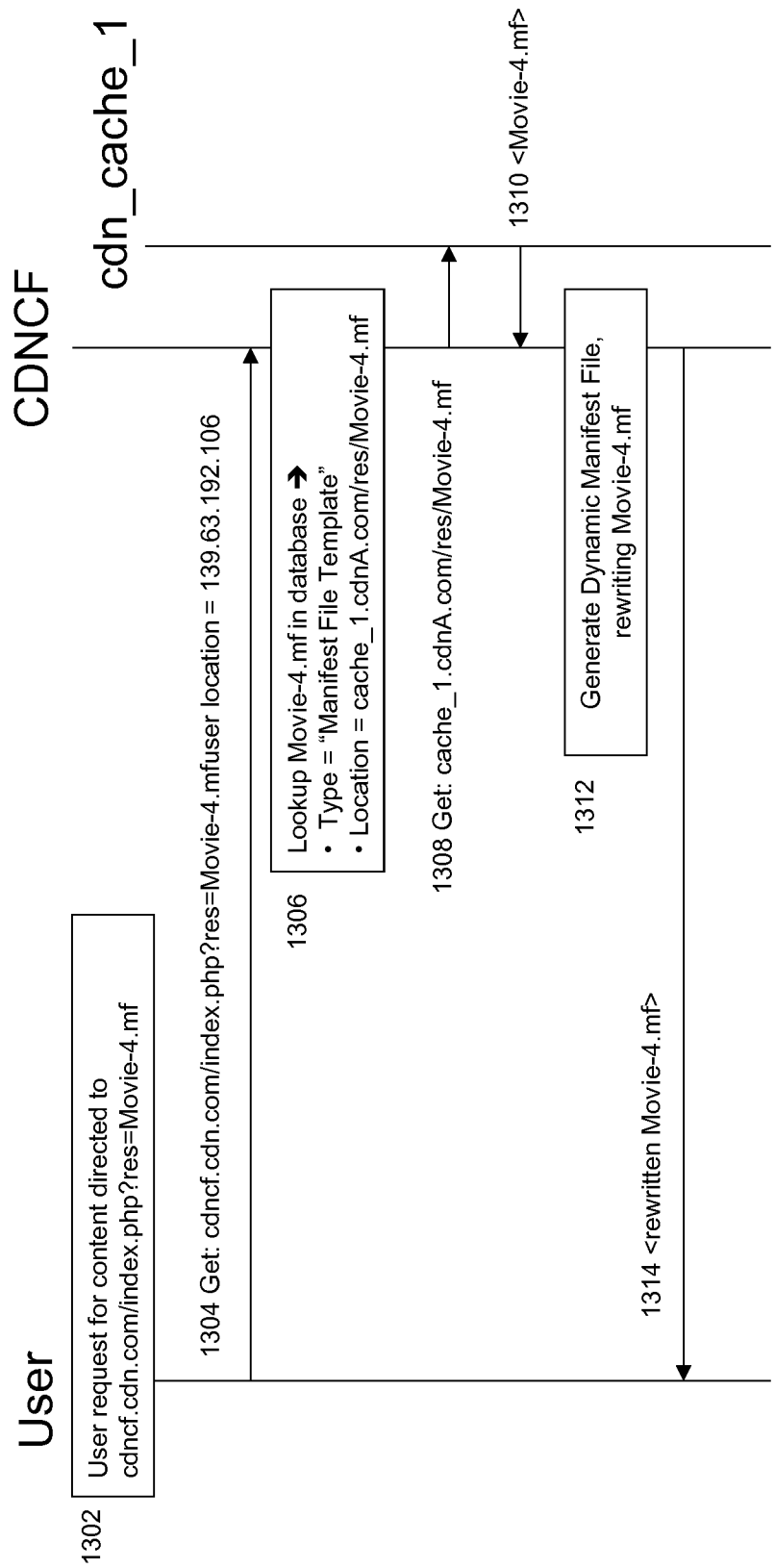
FIG. 13 depicts a sequence diagram of a process for generating a DMF according to an embodiment of the invention.

FIG. 13 depicts a sequence diagram of a process for generating a DMF according to an embodiment of the invention. This process may start with sending a user request or a request from a content control function in the network, e.g. an IPTV control function, comprising a URL pointing to an entry Movie-4.mf in the content location database of the CDN and a user location in the form of an IP address to the CDNCF of CDN A (steps 1302 and 1304). The CDNCF will perform a database look-up determining that the database entry in the request relates to a type of a MF template wherein the MF template Movie-4.mf is located at a cache of a particular delivery node in CDN A (step 1306). The MF template is subsequently retrieved (steps 1308 and 1310) and—on the basis of the MF template—a DMF is generated by rewriting the database entries in the MF template (step 1312). The DMF is subsequently sent to the user or the content control function (step 1314).

Figure 14:
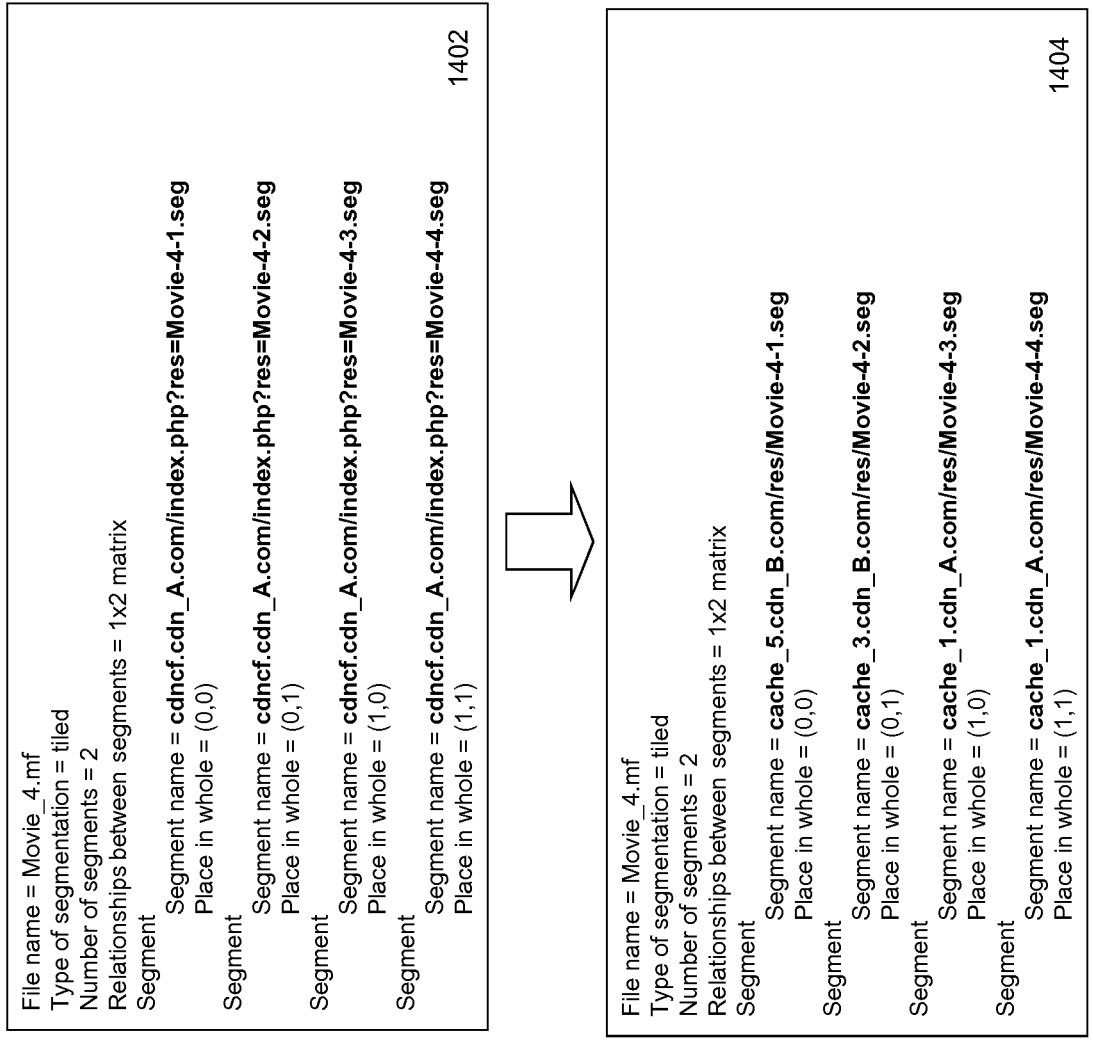
FIG. 14 depicts the formation of DMF associated with a user request according to an embodiment of the invention.

FIG. 14 depicts the formation of a DMF associated with a user request according to an embodiment of the invention. A MF template 1402 may be used as a basis for generating a DMF associated with a particular user 1404. The process of generating a DMF may determine that the best suited delivery nodes for delivering the segments in the DMF to the user are located in two CDN domains, i.e. CDN A and B.

Figure 15:
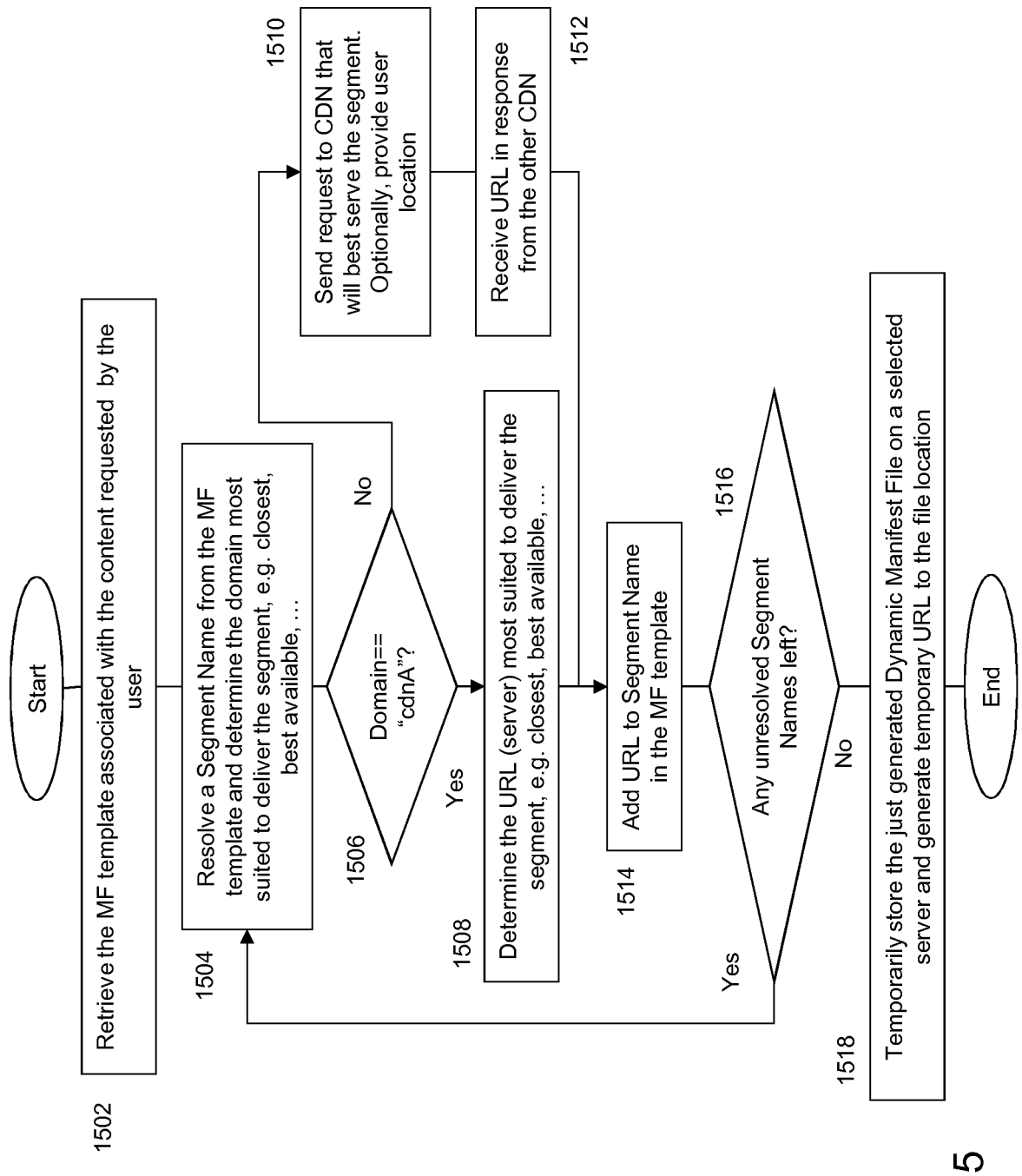
FIG. 15 depicts a flow chart for the process of generating a manifest file associated with a user request according to an embodiment of the invention.

FIG. 15 depicts a flow chart of the process of generating a DMF associated with a user request or a content control function as described in FIG. 13, in more detail. The process may start with the CDNCF retrieving the MF template associated with the content request indicated by the user or the content control function. (step 1502).

Thereafter, a loop is started wherein segment names in the MF template, which are pointers to entries in the content location database, are resolved into locations (URLs). On the basis of user or content control function information (e.g. IP address) the domain most suited for deliver the segment (e.g. closest or best available) is determined (step 1504). If this domain is the domain associated with the user request or the content control function request (i.e. CDN A) (step 1506), the location (URL) of the delivery node in CDN A most suited to delivery the segment may be selected (step 1508). This URL may be subsequently inserted as the segment name in the MF template (step 1514).

If it is determined that another domain is more suited to deliver a segment, a request, which may optionally comprise the user location (e.g. IP address), may be sent to the CDNCF of that CDN (step 1510). In response to the request, an URL may be received from the CDN (step 1512). This URL may be subsequently added to the segment name in the MF template (step 1514).

This process is repeated for all segments in the MF template thereby forming a DMF, which may be temporarily stored on a cache associated with the CDNCF. An URL may be generated for locating the thus generated DMF (step 1518).

In an embodiment of the invention the CDNCF that is generating the DMF bundles all location requests aimed at a particular CDNCF in another CDN into a single request. This allows for more efficient communication between CDNCFs of different CDNS and decreases the load in the CDNCF in the other CDN domain. To do so, the CDNCF in CDN A might create a new partial MF, which is not used by the CDNCF of CDN B to ingest the relevant segments but to tell CDN A of the most suitable locations of the segments for a particular user.

Figure 16:
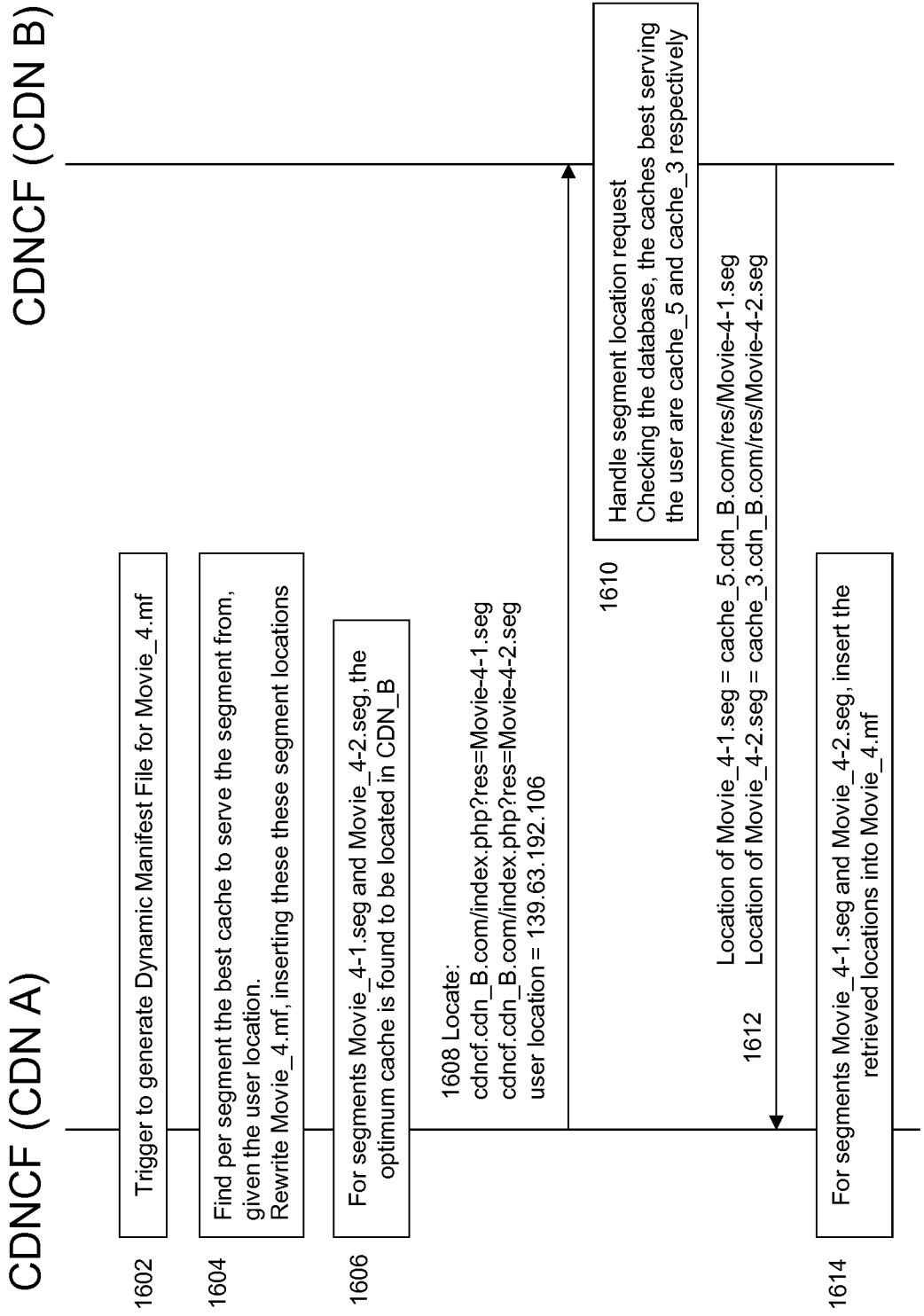
FIG. 16 depicts a sequence diagram for the process of generating a manifest file associated with a user request according to an embodiment of the invention.

FIG. 16 depicts a sequence diagram illustrating the process of generating a DMF associated with a user request or a content control function as described in FIG. 13 in more detail. The process may start with a trigger to generate a DMF on the basis of a MF template Movie_4.mf (step 1602). Thereafter, per segment in the MF template, the best delivery node to deliver the segment to a given location of the user or the content control function may be determined (step 1604) using a process as described with reference to FIG. 15. For two segments, Movie_4-1.seg and Movie_4-2.seg the best delivery nodes are determined to be located in the domain of CDN B (step 1606). For these two segments the CDNCF forwards a segment location request comprising the URL of the CDNCF of CDN B, the two identifiers uniquely identifying the segments in CDN B and the user location (step 1608). Alternatively, as described earlier, this request may comprise a partial MF containing the segment identifiers. The CDNCF of CDN B may handle the location request by checking the database entries and determining the locations (URLS) of the best serving delivery nodes in CDN B on the basis of the user location (step 1610). The thus determined locations are returned to the CDNCF of CDN A (step 1612) and inserted in the MF template (step 1614), so completing the dynamic MF.

Hence, the process described with reference to FIG. 16 provides an CDN interconnect scheme allowing one CDN to request the location of one or more segments from another CDN, wherein the returned locations may relate to delivery nodes which are best suited for delivery of a segment to a user or a content control function such as an IPTV control function in the network.

Figure 17:
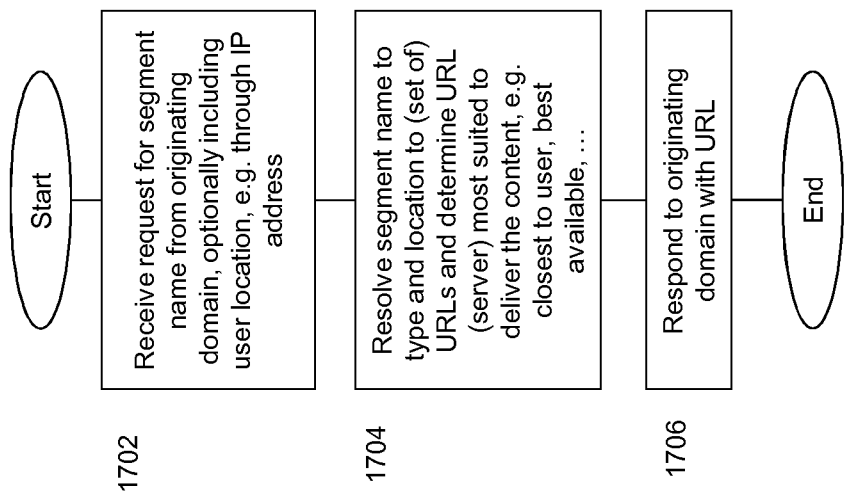
FIG. 17 depicts a flow diagram of handling a segment location request from CDN A to CDN B according to an embodiment of the invention.

FIG. 17 depicts a flow diagram of handling a segment location request from CDN A to CDN B according to an embodiment of the invention. In a first step 1702, CDN B, the receiving domain receives a request for locating one or more segments from CDN A, the originating domain. In response to the request, CDN B, in particular the CDNCF of CDN B, may resolve the one or more segment identifiers into a type and location, e.g. a (set of) URL(s) wherein the location of the most suited delivery node is selected (step 1704) and returned in a response CDN A (step 1706). In one embodiment, the process is recursive, where CDN B has some segments delegated to CDN C, and CDN B performs a process that is similar to the process described in FIG. 15 and FIG. 16.

Figure 18:
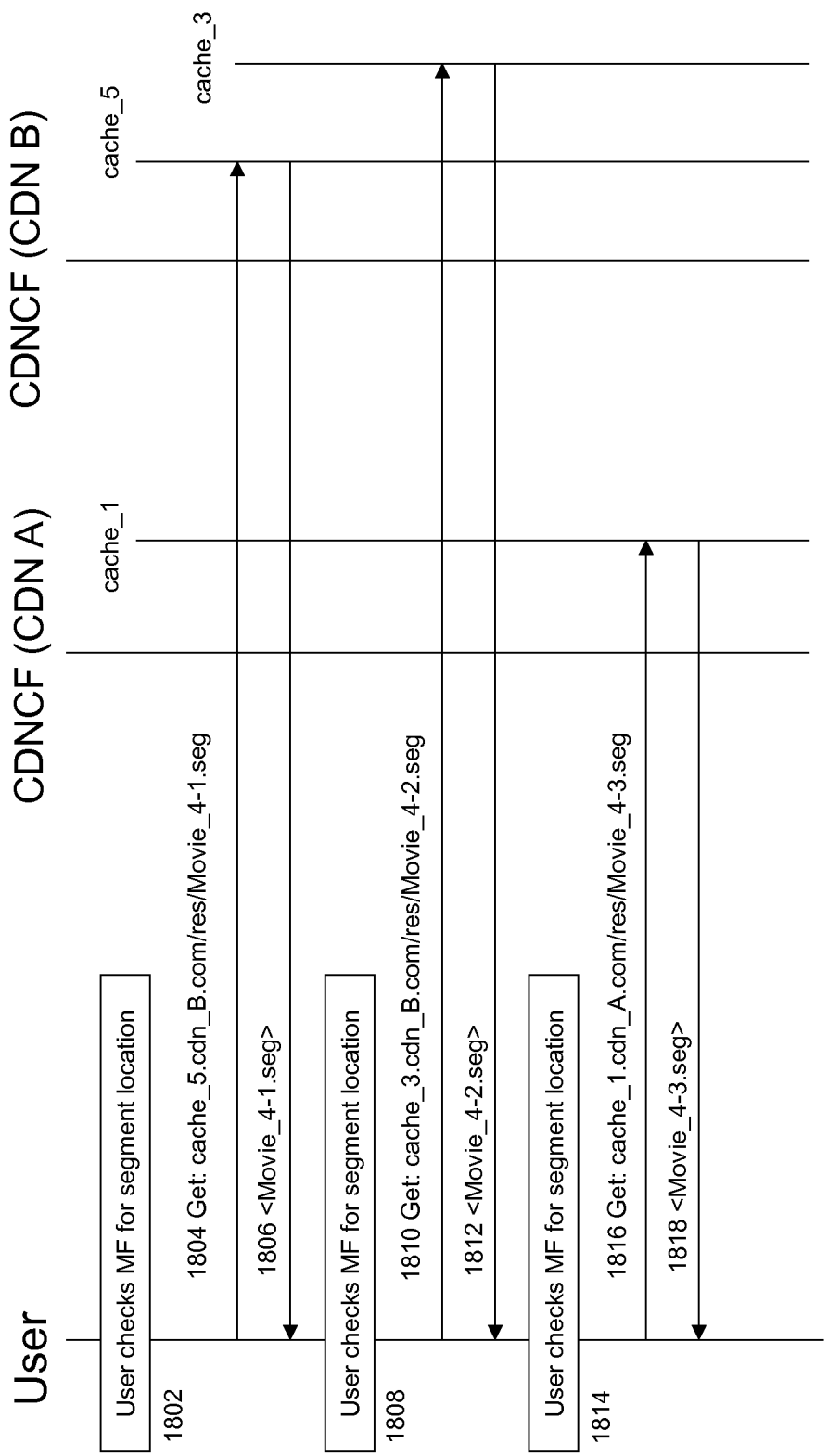
FIG. 18 depicts a sequence diagram for a process of retrieving segmented content from a first and second CDN on the basis of DMF according to an embodiment of the invention.

FIG. 18 depicts a sequence diagram of a process of retrieving segmented content from a first and second CDN on the basis of a DMF according to an embodiment of the invention. In this case the user (the client) or the content control function has received the DMF from CDN A or CDN B and determines the locations of the segments defined in the DMF. For example, in the example of FIG. 18 on the basis of the locations in the DMFs the client may request and receives the first and second segments directly from a first and second delivery node in CDN B (step 1804, 1806 and step 1810, 1812) and a third segment from a delivery node of CDN A (step 1816).

With reference to the alternative described in the last paragraph associated with FIG. 10, in case the segment requested in step 1804 was not pre-ingested by CDN-node B (and not yet present at cache_5), the step 1804 may be followed by a steps of cache 5 requesting from CDN A the 'missing' segment and the subsequent receipt of the segment by cache_5, before it may be delivered to the client, according to step 1806. Such model also referred to as a "pull" model.

Hence, the dynamically generated DMFs allow direct retrieval of content from different CDN domains. The DMF allows fast switching between the different segments defined in the DMF. The segment retrieval does not need redirect type of mechanisms in order to locate segments in different CDN domains, thereby providing a fast and efficient retrieval mechanism for segmented content. Such content retrieval mechanism may be used in content services which allow user-interaction with the content, e.g. panning, zooming, tilting and seamless switching between various versions of a stream.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. A method for locating segmented content, the segmented content being distributed over at least a first content delivery network (CDN) comprising a first content location database and a second content delivery network comprising a second content location database, the method comprising:
at a first central CDN node comprising a CDN control function (CDNCF) in the first content delivery network, the CDNCF retrieving, from a cache associated with a first delivery node in the first content delivery network, a manifest file template associated with the segmented content, the manifest file template comprising one or more pointers to database entries of the first content location database;
based on information in the one or more database entries pointed to in the retrieved manifest file template, the CDNCF transmitting a request to the second content delivery network to determine, based on information in the second content location database, a location of a second delivery node in the second content delivery network, wherein the second delivery node is configured for delivering a segment associated with at least one of the database entries; and
the CDNCF generating a manifest file for locating the segmented content by replacing a pointer in the manifest file template with the determined location of the second delivery node in the second content delivery network,
wherein the database entries in the first content location database comprise a pointer to a database location comprising data that is at least one of: one or more locators for locating a delivery node configured to deliver a segment, or one or more pointers to the second content location database of the second content delivery network.

2. The method according to claim 1, wherein retrieving the manifest file template comprises retrieving the manifest file template from the cache associated with the first delivery node in response to reception of a location request for locating at least part of the segmented content.

3. The method according to claim 1, further comprising:
for at least one of the database entries making a selection of one or the other of the first or the second content delivery network for delivering a segment associated with at least one of the database entries.

4. The method according to claim 3, wherein making the selection comprises selecting on the basis of a location request.

5. A method for moving at least part of a segmented content from a first content delivery network (CDN) comprising a first content location database to a second content delivery network comprising a second content location database, the method comprising:
at a first central CDN node comprising a CDN control function (CDNCF) in the first content delivery network, the CDNCF retrieving, from a cache associated with a first delivery node in the first content delivery network, a manifest file template associated with the segmented content, the manifest file template identifying one or more segments of the segmented content and comprising one or more pointers to database entries of the first content location database, the pointers associated with the identified segments;
the CDNCF determining segment metrics for at least part of the segments identified by the manifest file template, the segment metrics comprising quantitative characteristics of segment usage;
on the basis of the segment metrics, the CDNCF selecting one or more segments to move from the first content delivery network to the second content delivery network;
the CDNCF generating a partial manifest file by replacing the pointers in the manifest file template associated with the selected one or more segments with one or more locations of delivery nodes in the first content delivery network which are configured to deliver the selected segments; and
the CDNCF transmitting the partial manifest file from the first content delivery network to the second content delivery network,
wherein the database entries in the first content location database comprise a pointer to a database location comprising data that is at least one of: one or more locators for locating a delivery node configured to deliver a segment, or one or more pointers to the second content location database of the second content delivery network.

6. The method according to claim 5 further comprising:
requesting the second content delivery network to ingest at least part of the segments identified in the partial manifest file.

7. A control function module for locating segmented content, the segmented content being distributed over at least a first content delivery network (CDN) comprising with a first content location database and a second content delivery network comprising a second content location database, the control function module being comprised in the first CDN and comprising:
one or more processors and stored instructions that, when executed by the one or more processors, cause the control function module to carry out operations including:
retrieving, from a cache associated with a first delivery node in the first content delivery network, a manifest file template comprising one or more pointers to database entries of the first content location database;
based on information in the one or more database entries pointed to in the retrieved manifest file template, transmitting a request to the second content delivery network to determine, based on information in the second content location database, a location of a second delivery node in the second content delivery network, wherein the second delivery node is configured for delivering a segment associated with at least one of the database entries; and
generating a manifest file for locating the segmented content by replacing a pointer with the determined location of the second delivery node in the second content delivery network,
wherein the database entries in the first content location database comprise a pointer to a database location comprising data that is at least one of: one or more locators for locating a delivery node configured to deliver a segment, or one or more pointers to the second content location database of the second content delivery network.

8. A non-transitory computer-readable medium having instructions stored thereon that, when executed by one or more processors of a device in system for locating segmented content distributed over at least a first content delivery network (CDN) comprising a first content location database and a second content delivery network comprising a second content location database, wherein the device is comprised in the first CDN, cause the device to carry out operations including:
retrieving, from a cache associated with a first delivery node in the first content delivery network, a manifest file template associated with the segmented content, the manifest file template comprising one or more pointers to database entries of the first content location database;
based on information in the one or more database entries pointed to in the retrieved manifest file template, transmitting a request to the second content delivery network to determine, based on information in the second content location database, a location of a second delivery node in the second content delivery network, wherein the second delivery node is configured for delivering a segment associated with at least one of the database entries; and
generating a manifest file for locating the segmented content by replacing a pointer in the manifest file template with the determined location of said delivery node in the second content delivery network,
wherein the database entries in the first content location database comprise a pointer to a database location comprising data that is at least one of: one or more locators for locating a delivery node configured to deliver a segment, or one or more pointers to the second content location database of the second content delivery network.

9. The method of claim 4, wherein selecting on the basis of the location request comprises selecting on the basis of location information associated with a location request.

10. The method according to claim 1, wherein the transmitted request to the second content delivery network comprises a partial manifest file, wherein the partial manifest file comprises one or more segment identifiers.

11. The method according to claim 1, wherein retrieving the manifest file template comprises retrieving the manifest file template in response to a user request comprising a content name or identifier.

12. The method according to claim 1, further comprising receiving the determined location of the second delivery node at the first content delivery network from the second content delivery network.

13. The method according to claim 12, wherein receiving the determined location of the second delivery node comprises receiving the determined location as part of a partial manifest file.

14. The control function module according to claim 7, wherein the operations further include receiving a determined location from the second content delivery network.

* * * * *